United States Patent
Fang et al.

(10) Patent No.: US 8,592,339 B2
(45) Date of Patent: Nov. 26, 2013

(54) CATALYTIC PLATINUM-COPPER ALLOY NANOPARTICLES

(75) Inventors: Jiye Fang, Vestal, NY (US); Dan Xu, Zhejiang (CN)

(73) Assignee: The Research Foundation for the State University of New York, Binghamton, NY (US)

( * ) Notice: Subject to any disclaimer, the term of this patent is extended or adjusted under 35 U.S.C. 154(b) by 161 days.

(21) Appl. No.: 12/953,422

(22) Filed: Nov. 23, 2010

(65) Prior Publication Data

US 2011/0124500 A1    May 26, 2011

Related U.S. Application Data

(60) Provisional application No. 61/263,558, filed on Nov. 23, 2009.

(51) Int. Cl.
*B01J 23/00* (2006.01)
*B01J 21/00* (2006.01)

(52) U.S. Cl.
USPC ........... 502/331; 502/326; 502/334; 502/339; 977/810; 977/896

(58) Field of Classification Search
USPC ........... 502/326, 331, 334, 339; 977/810, 896
See application file for complete search history.

(56) References Cited

U.S. PATENT DOCUMENTS

| | | | | |
|---|---|---|---|---|
| 4,716,087 A | * | 12/1987 | Ito et al. | 429/498 |
| 4,970,128 A | * | 11/1990 | Itoh et al. | 429/498 |
| 5,024,905 A | * | 6/1991 | Itoh et al. | 429/524 |
| 5,096,866 A | * | 3/1992 | Itoh et al. | 502/101 |
| 5,178,971 A | * | 1/1993 | Itoh et al. | 429/498 |
| 6,875,253 B2 | * | 4/2005 | Daimon et al. | 75/255 |
| 7,144,627 B2 | * | 12/2006 | Halas et al. | 428/403 |
| 7,371,457 B2 | * | 5/2008 | Oldenburg et al. | 428/403 |
| 7,455,712 B2 | * | 11/2008 | Sato | 75/255 |
| 7,575,621 B2 | * | 8/2009 | Vanheusden et al. | 75/351 |
| 7,585,349 B2 | * | 9/2009 | Xia et al. | 75/371 |
| 7,625,637 B2 | * | 12/2009 | Kim | 428/570 |
| 7,662,740 B2 | * | 2/2010 | Chondroudis et al. | 502/180 |
| 7,700,521 B2 | * | 4/2010 | Giaquinta et al. | 502/345 |
| 7,749,300 B2 | * | 7/2010 | Chretien et al. | 75/371 |

(Continued)

OTHER PUBLICATIONS

Gustavo Demarco et al., "Growth of Pt/Cu(100): an atomistic modeling comparison with the Pd/Cu(100) surface alloy", Surface Science 526 (2003) 309-322.*

*Primary Examiner* — Cam N. Nguyen
(74) *Attorney, Agent, or Firm* — Steven M. Hoffberg; Ostrolenk Faber LLP

(57) ABSTRACT

High-quality bimetallic $Pt_xCu_{100-x}$ (x=54-80 at. %) nanocubes can be prepared from a hot organic solution. Synthetic conditions, such as the ratio of oleylamine/tetraoctylammonium bromide as well as the doses of 1-dodecanethiol and 1,2-tetradecanediol have been optimized to ensure a formation of Pt—Cu nanocubes. Electrochemical evaluation shows that the catalytic activity of $Pt_{60}Cu_{40}$ nanocubes for methanol oxidation is superior, in comparison with those of spherical $Pt_{60}Cu_{40}$ nanocubes and Pt nanocubes with similar sizes, implying that the {100}-terminated $Pt_{60}Cu_{40}$ nanocubes offer a higher activity for methanol oxidation reaction than those with mixed crystallographic facets do. As another example, it was identified that $Pt_{80}Cu_{20}$ nanocubes is the best electrocatalyst on the basis of the maintainable electrocatalytic activity (which is even slightly superior to that of pure Pt nanocubes) and remarkable long-term stability (~300 hours vs 3 hours for Pt nanocubes) when being performed towards formic acid oxidation reaction.

19 Claims, 12 Drawing Sheets

(56) References Cited

U.S. PATENT DOCUMENTS

| | | | |
|---|---|---|---|
| 7,811,965 B2* | 10/2010 | Cendak et al. | 502/326 |
| 7,871,738 B2* | 1/2011 | Stamenkovic et al. | 429/524 |
| 8,257,465 B2* | 9/2012 | Xia et al. | 75/361 |
| 2007/0010396 A1* | 1/2007 | Giaquinta et al. | 502/345 |
| 2007/0026292 A1* | 2/2007 | Adzic et al. | 429/44 |
| 2007/0031722 A1* | 2/2007 | Adzic et al. | 429/44 |
| 2009/0282948 A1* | 11/2009 | Xia et al. | 75/255 |
| 2011/0185852 A1* | 8/2011 | Allemand | 75/343 |

* cited by examiner

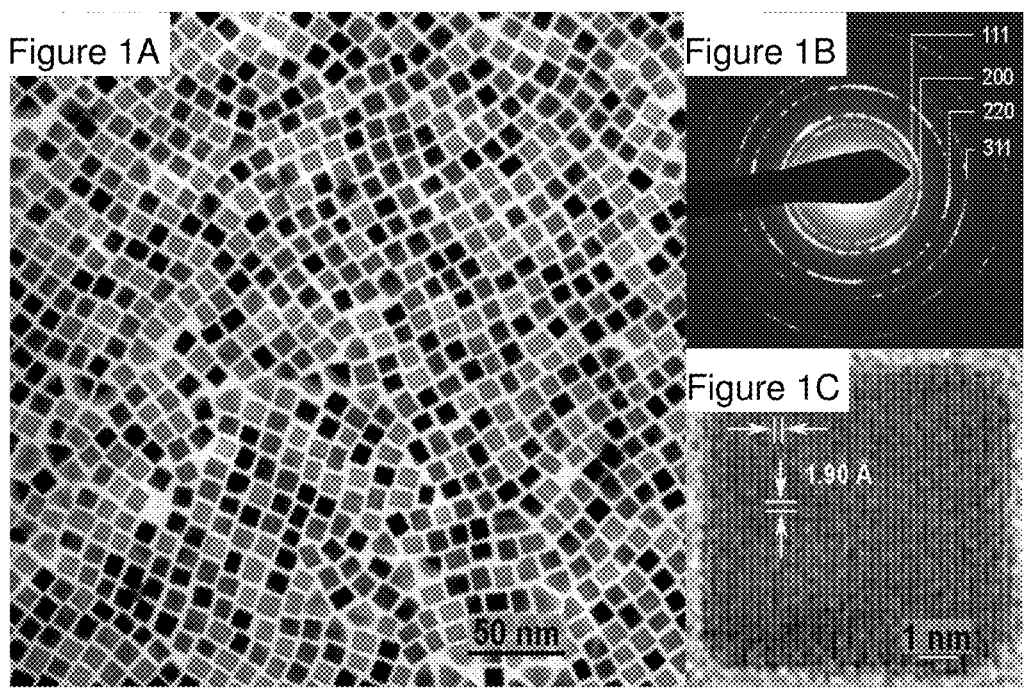
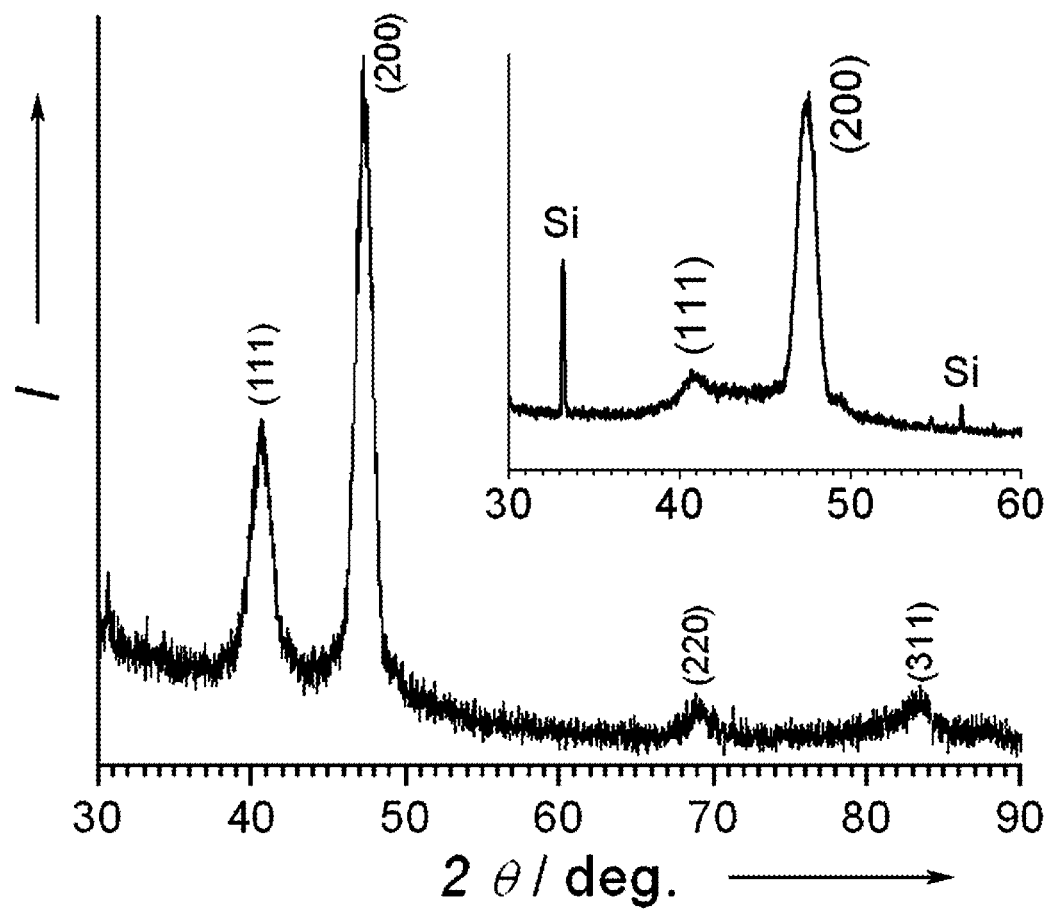
Figure 2

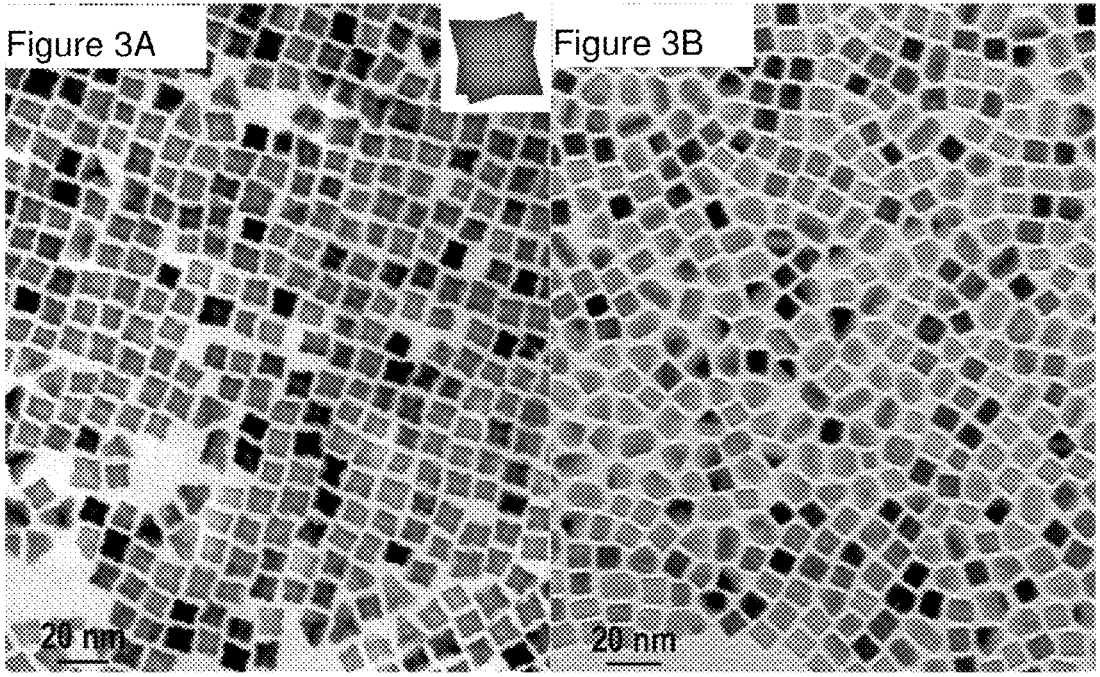
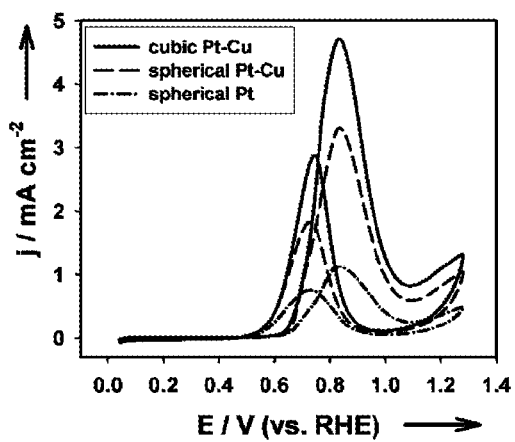
Figure 4A
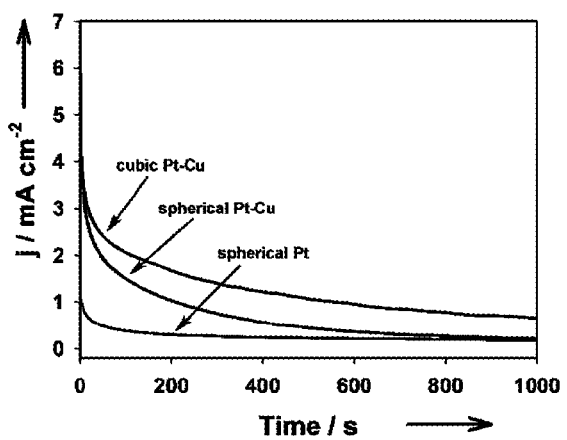
Figure 4B
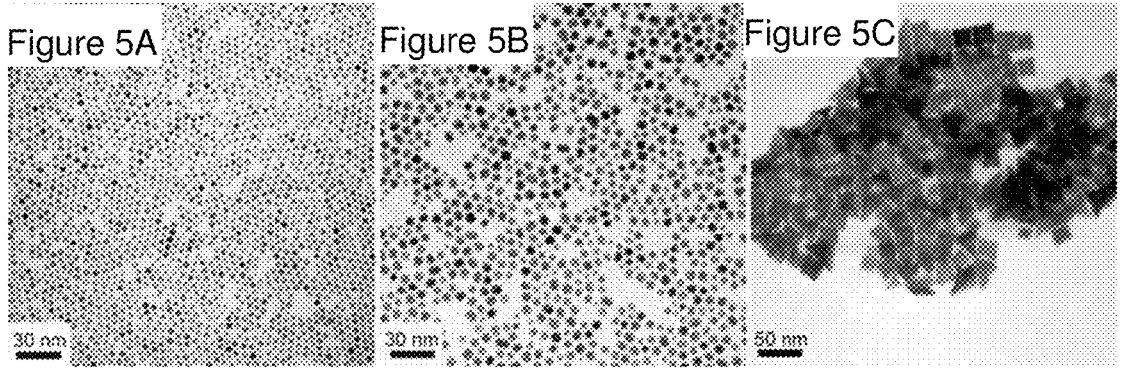

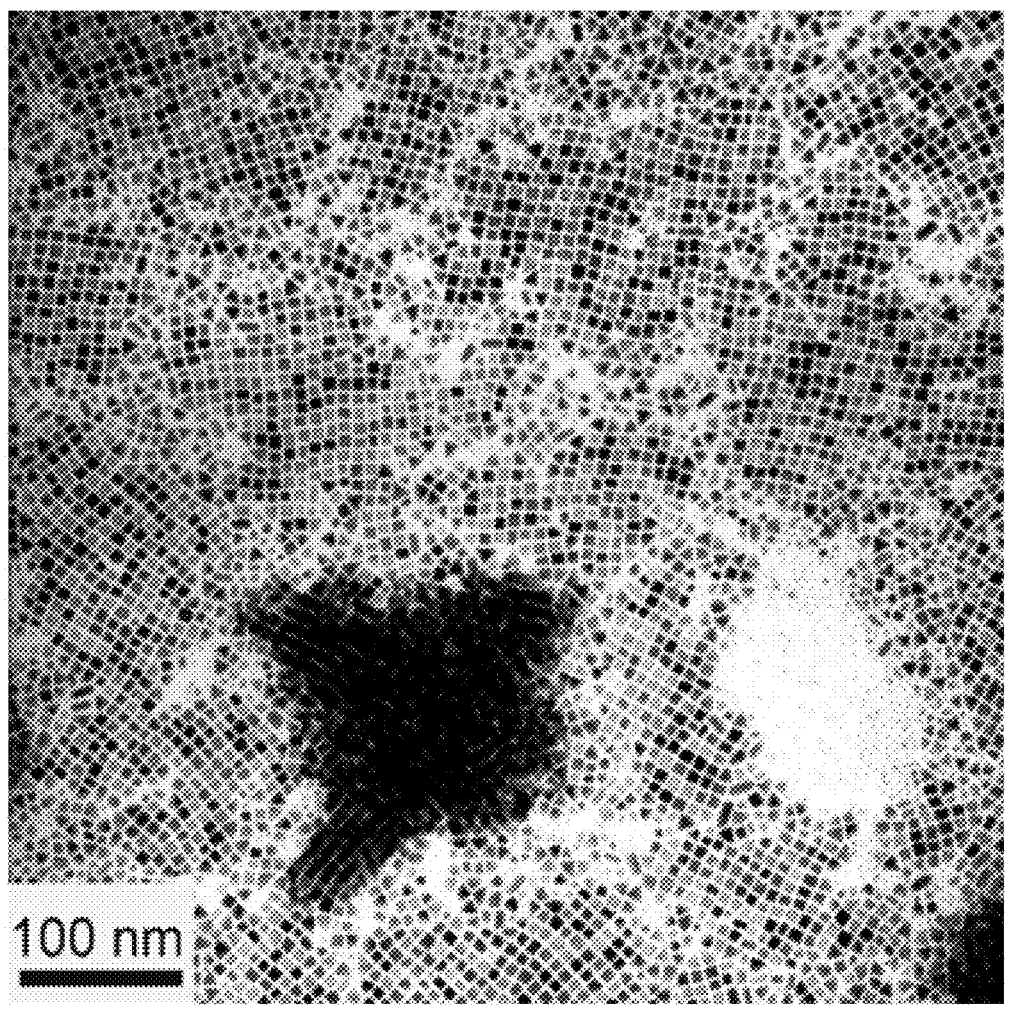
Figure 6
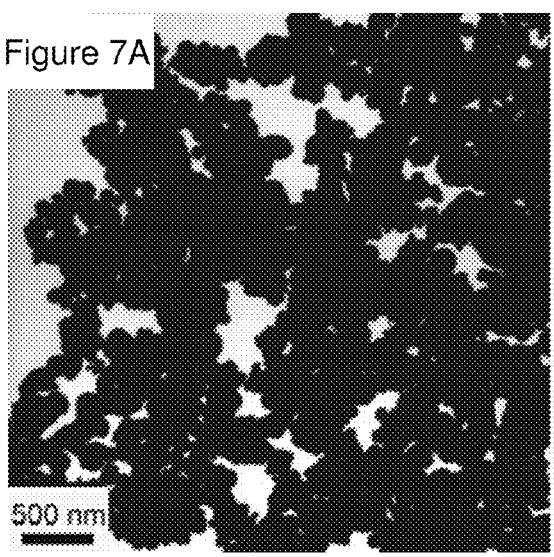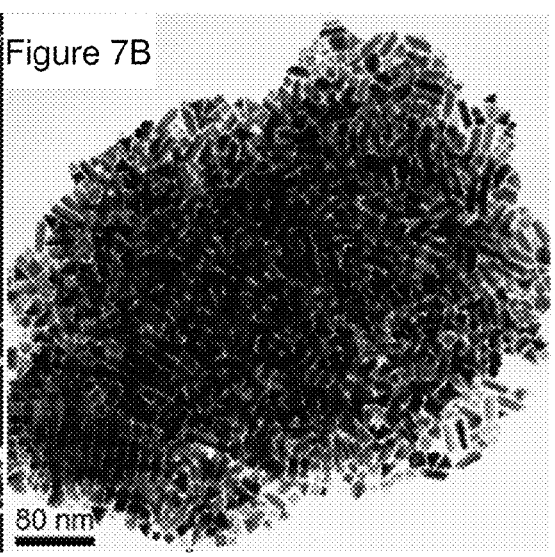

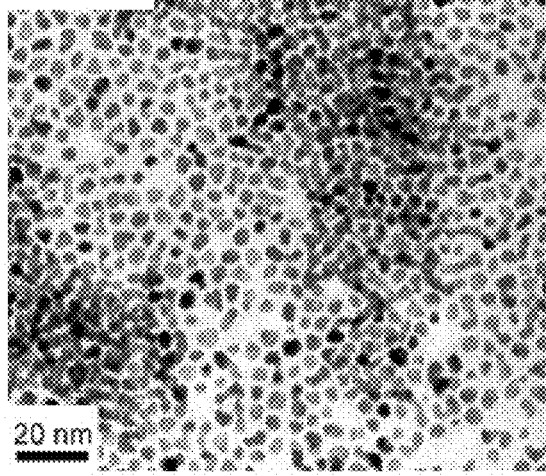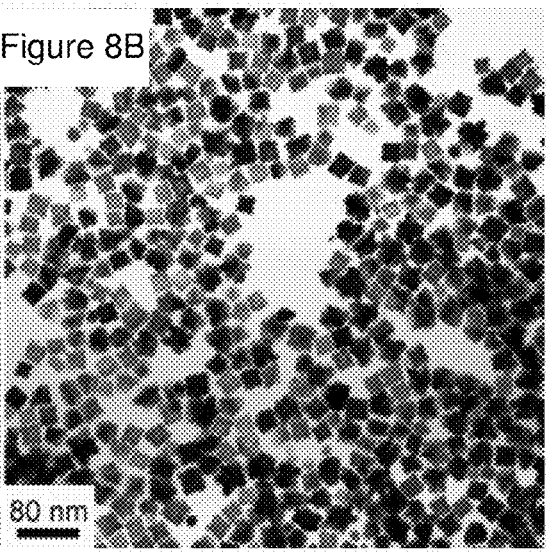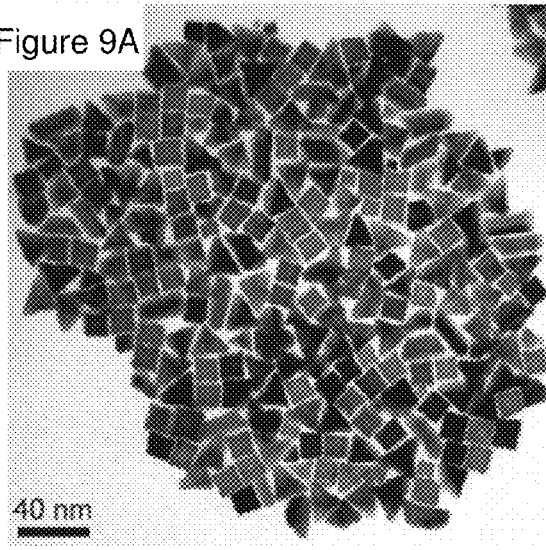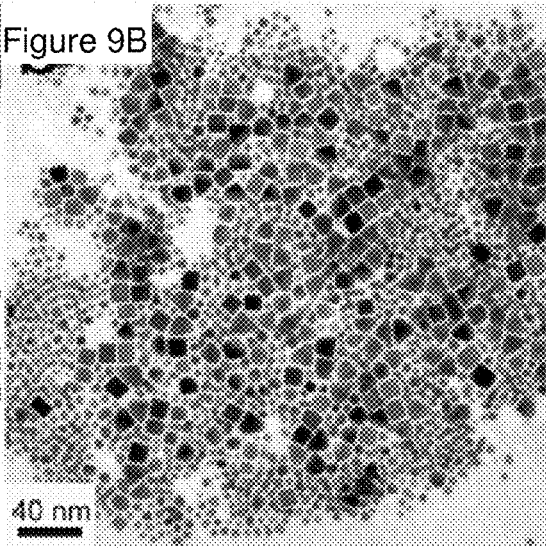

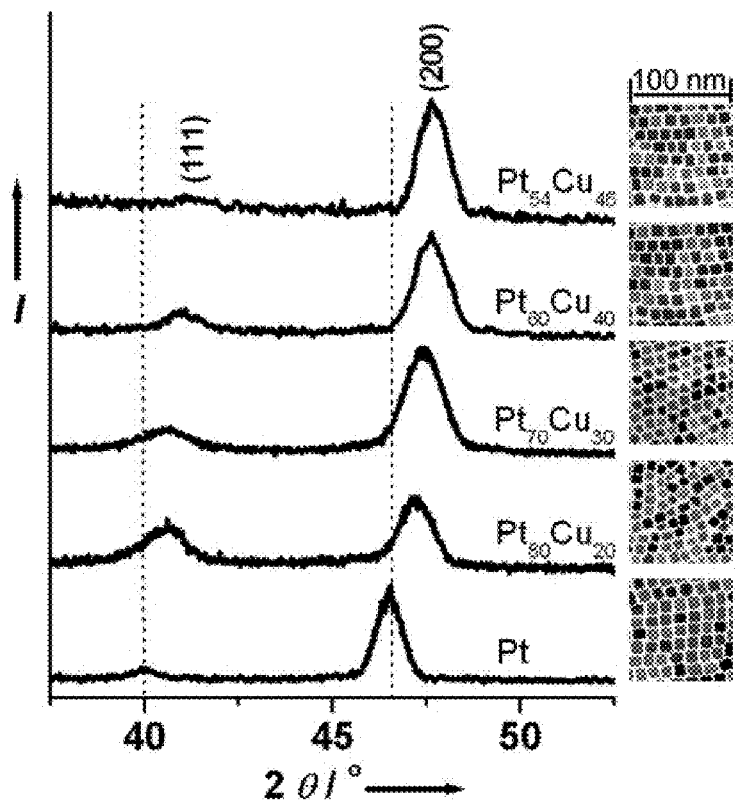
Figure 11
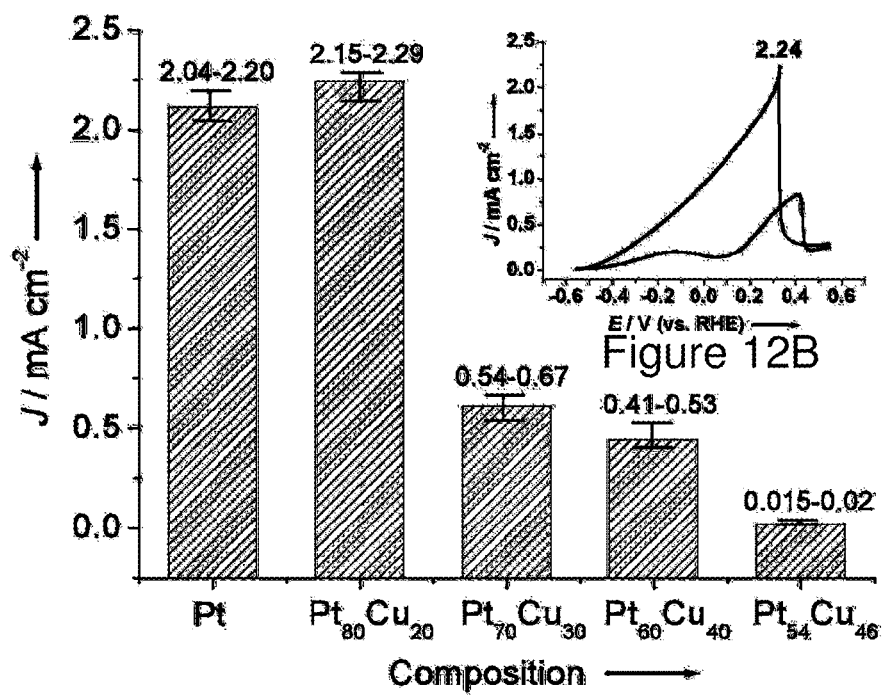
Figure 12B
Figure 12A

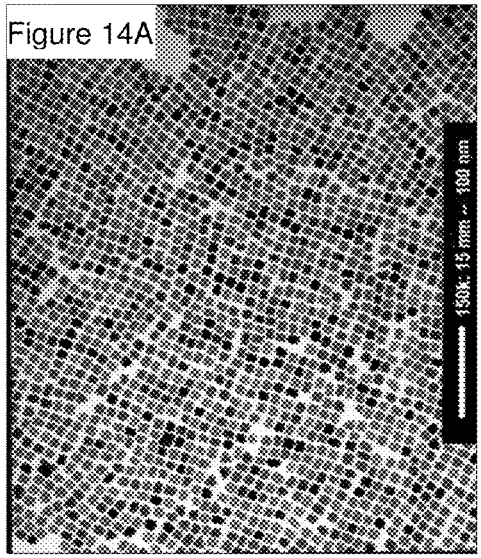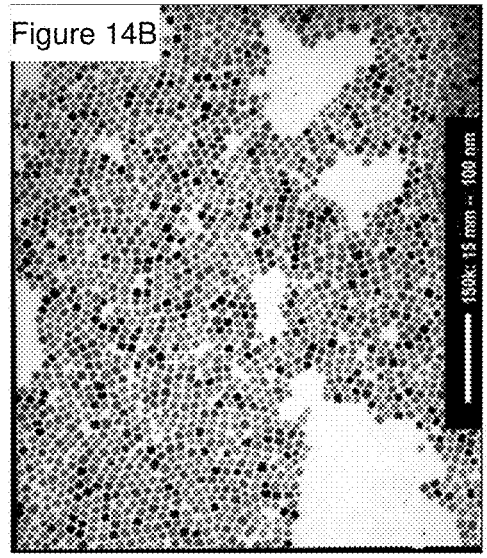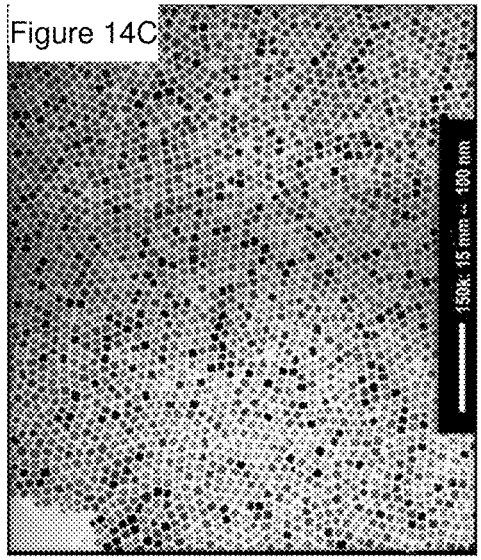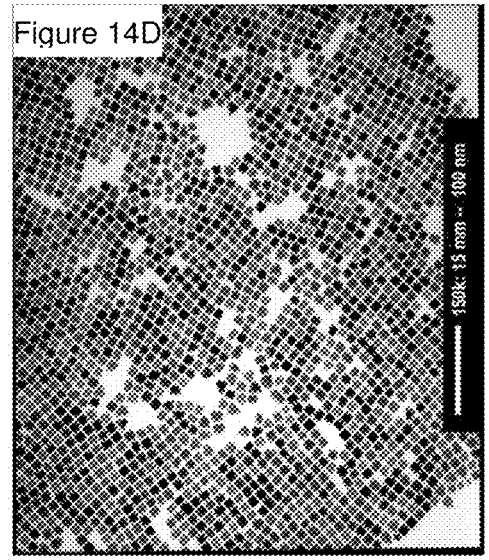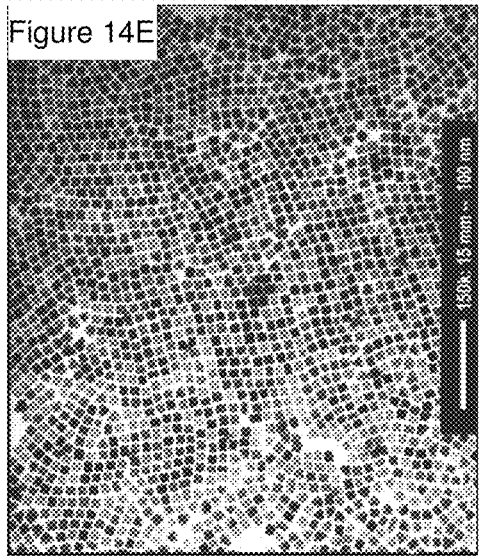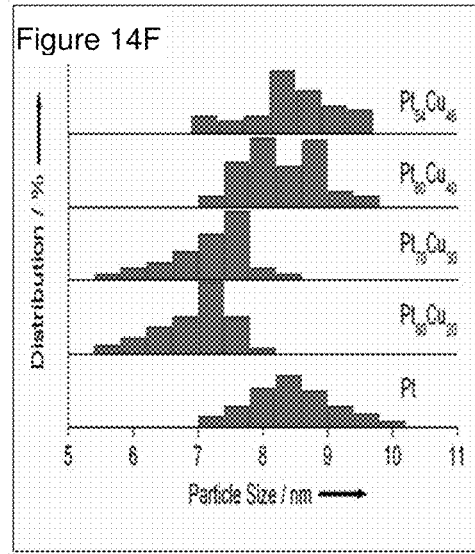

CATALYTIC PLATINUM-COPPER ALLOY NANOPARTICLES

This invention was made with government support under DMR-0731382 awarded by the National Science Foundation. The government has certain rights in the invention.

BACKGROUND OF THE INVENTION

It is an urgent task to seek other energetic resources or different energy conversion pathways to replace the burning of fossil fuels such as gasoline or diesel, due to the increasing worldwide energy demand and environmental concerns. One of the promising efforts is the development of fuel cell technology. Fuel cells exhibit exciting performance advantages for power generation by converting the chemical energy of a fuel directly into electricity. The intense interest in fuel cell technology stems from the fact that fuel cells are environmentally benign and extremely efficient. Among various types of fuel cells, the proton-exchange membrane fuel cells (PEMFCs) and direct methanol fuel cells (DMFCs) are appealing for automotive and portable electronic applications owing to their low operation temperatures.[1-3] Unfortunately, the high cost of Pt electrocatalyst still remain serious limitations to many applications. In this regard, it is rather challenging to explore more active and low-cost catalysts superior to the standard carbon-supported platinum (Pt/C) particle systems which are traditionally employed.

Precious metal, platinum (Pt), is traditionally used as a high-performance electrocatalyst for proton-exchange membrane fuel cells and fine chemical synthesis. Due to the high-cost and the scarcity of Pt, it is an urgent task to develop substitutes for the pure Pt-catalyst. To date, one of the most successful accomplishments is to partially substitute Pt using less expensive 3$d$-transition metals. It was also realized that the shape and surface structure of nanocrystals (NCs) plays a significant role in electrocatalytic activity and reaction durability. For instance, it has been reported that cubic Pt Nanocrystals possess unusual catalytic activity in oxidation reactions. As well-known, the electron density of state is actually sensitive with the surface structure, and different crystal facets could have diverse catalytic natures.

Platinum (Pt) nanoparticles (NPs) have been extensively studied because of their unique catalytic properties in various significant applications.[1-8] It has been realized that the catalytic activity of Pt Nanoparticles highly depends on the surface atomic arrangements on a particle.[9-11] For example, previous studies on oxygen reduction in adsorbing acidic solutions show that Pt {100} are more active than Pt {111} planes[12, 13] and the current density measured on Pt nanocubes is higher than that of truncated cubic Pt NCs.[14] As electrocatalysts, nanocubes of Pt[15-17] therefore received more attention than other morphologies such as multipod[18, 19] and one-dimensional nanostructure.[20, 21] To further reduce the overall use of expensive Pt and afford the potential of poisoning-resistance, Pt-based bimetallic NCs such as Pt—Ni,[22, 23] Pt—Co,[24-28] and Pt—Cu[29-32] have attracted an increasing interest. Moreover, recent reports indicate that electrocatalytic activities of some Pt-bimetallic NCs are superior to those of pure Pt metal.[25-28] A convenient and effective colloid method of synthesizing high-quality Pt—Cu nanocubes is provided.

SUMMARY OF THE INVENTION

The present invention relates to the synthesis of platinum-based catalytic NPs, having controlled configuration, such as nanocubes, which are enclosed by {100} facets, via a high-temperature organic solution chemistry approach.

Increasing the electrocatalytic activity and durability are the key challenges in developing the fuel cell anode. Pt-based nanoparticles of alloys have been extensively shown to be effective catalysts for methanol and formic acid oxidation reaction used in fuel cells. However, less attention has been paid on the particle shape-control.

Furthermore, the shape-dependent oxidation activity likely exists on other metallic catalysts. The present shape-controlled strategy may be extended to the syntheses of other nonprecious metal-Pt nanopolyhedral alloys, which are potential candidates of highly active fuel cell catalysts.

It is therefore an object to provide a method of forming catalytic nanocubes, comprising heating in an organic solution, a soluble platinum salt, a transition metal salt, and a set of surface active capping agents, the solution having shape control properties to selectively control a particle shape; and reducing the platinum salt and transition metal salt to form catalytically active platinum alloy nanocubes.

It is a further object to provide a method of forming substantially monodisperse catalytic nanocubes, comprising heating in an organic solution, a platinum salt soluble in the heated organic solution, a transition metal salt, and a set of surface active capping agents, the solution having shape control properties to selectively control a particle shape to form cubic particles; and reducing the platinum salt and transition metal salt with a chemical reducing potential to form catalytically active platinum alloy nanocubes.

It is a still further object to provide substantially monodisperse nanocube alloy particles formed by a process comprising heating in an organic solution, a soluble platinum salt, a transition metal salt, and a set of surface active capping agents, the solution having shape control properties to selectively control a particle shape; and reducing the platinum salt and transition metal salt to form catalytically active platinum alloy nanocubes.

The soluble platinum salt is, for example, platinum (II) acetylacetonate.

The transition metal salt is, for example, copper (II) acetylacetonate.

The solution may comprise a thiol coordination agent.

The solution may comprise an amine or diol reducing agent.

The surface active capping agent may comprises tetraoctylammonium bromide.

The solvent is preferably heated to about 210° C. to 230° C.

The preparative process is preferably conducted under anoxic conditions.

The formed particles may comprise, for example, at least 90% nanocubes.

The formed particles are preferably substantially monodisperse.

BRIEF DESCRIPTION OF THE DRAWINGS

FIG. 1A shows a low magnification TEM image of the overall morphology of $Pt_{60}Cu_{40}$ nanocubes.

FIG. 1B shows a TEM-selected area electron diffraction pattern of the $Pt_{60}Cu_{40}$ nanocubes.

FIG. 1C shows a high resolution TEM image of a selected $Pt_{60}Cu_{40}$ nanocube.

FIG. 2 shows a powder X-ray diffraction (XRD) pattern of the $Pt_{60}Cu_{40}$ nanocubes. The inset XRD pattern was recorded from a self-assembled thin film of $Pt_{60}Cu_{40}$ nanocubes on a polished silicon wafer, showing (100) texture.

FIG. 3 shows TEM images of intermediate products ($Pt_{60}Cu_{40}$) collected in a typical synthesis except those conditions specified. 3A shows that during the solution color-change from light yellow to dark brown while the system temperature reached at 223° C. (TDD: 0.25 mmol; DDT: 0.07 mmol); 3B shows the result after 4 min reaction at 230° C.

FIG. 4A shows Cyclic voltammograms of MeOH oxidation on $Pt_{60}Cu_{40}$ nanocubes, $Pt_{60}Cu_{40}$ nanospheres and Pt nanospheres in 0.1 M $HClO_4$+1.0 M MeOH (Scan rate: 0.02 V $s^{-1}$);

FIG. 4B shows Chronoamperometric results of MeOH oxidation at 0.8 V on $Pt_{60}Cu_{40}$ nanocubes, $Pt_{60}Cu_{40}$ nanospheres and Pt nanospheres in 0.1 M $HClO_4$+1.0 M MeOH.

FIG. 5 shows TEM images of the $Pt_{60}Cu_{40}$ nanoparticles synthesized in the typical conditions with different amounts of TOAB: 5A, no TOAB; 5B, 0.3 mmol of TOAB; 5C, 1.0 mmol of TOAB. (TOAB: tetraoctylammonium bromide)

FIG. 6 shows TEM image of as-prepared $Pt_{60}Cu_{40}$ nanocubes in the typical conditions using 0.6 mmol of CTAB. (CTAB: cetyltrimethylammonium bromide)

FIG. 7 shows TEM images of $Pt_{60}Cu_{40}$ nanocubes synthesized in the typical conditions. 7A, in absence of OLA; 7B, with 1.8 mmol of OLA. (OLA: oleylamine)

FIG. 8 shows TEM images of the $Pt_{60}Cu_{40}$ nanoparticles synthesized in the typical conditions. 8A, in absence of DDT; 8B, with 0.075 mmol of DDT. (DDT: $C_{12}SH$, 1-dodecanethiol)

FIG. 9 shows TEM images of the $Pt_{60}Cu_{40}$ nanoparticles synthesized in the typical conditions. 9A, in absence of TDD; 9B, with 1.0 mmol of TDD. (TDD: 1,2-tetradecanediol)

FIG. 11 shows XRD patterns of Pt and $Pt_xCu_{100-x}$ nanocubes with different compositions. Inserts show the corresponding TEM images. A scale bar of 100 nm is applied for all of the images.

FIG. 12A shows peak current density of formic acid oxidation as a function of the $Pt_xCu_{100-x}$ nanocube compositions.

FIG. 12B shows the CV curve measured in 0.1 M $HClO_4$+2.0 M HCOOH solution at 50 mV/s on $Pt_{80}Cu_{20}$ nanocube catalyst.

FIG. 14 shows TEM images and size distribution of nanocubes of Pt and $Pt_xCu_{(100-x)}$: 14A, Pt; 14B, $Pt_{80}Cu_{20}$; 14C, $Pt_{70}Cu_{30}$; 14D, $Pt_{60}Cu_{40}$; 14E, $Pt_{54}Cu_{46}$; and 14F, size distribution of the samples.

DETAILED DESCRIPTION OF THE PREFERRED EMBODIMENTS

EXAMPLE 1

1. General Synthetic Procedure and Characterization

Figure 10:
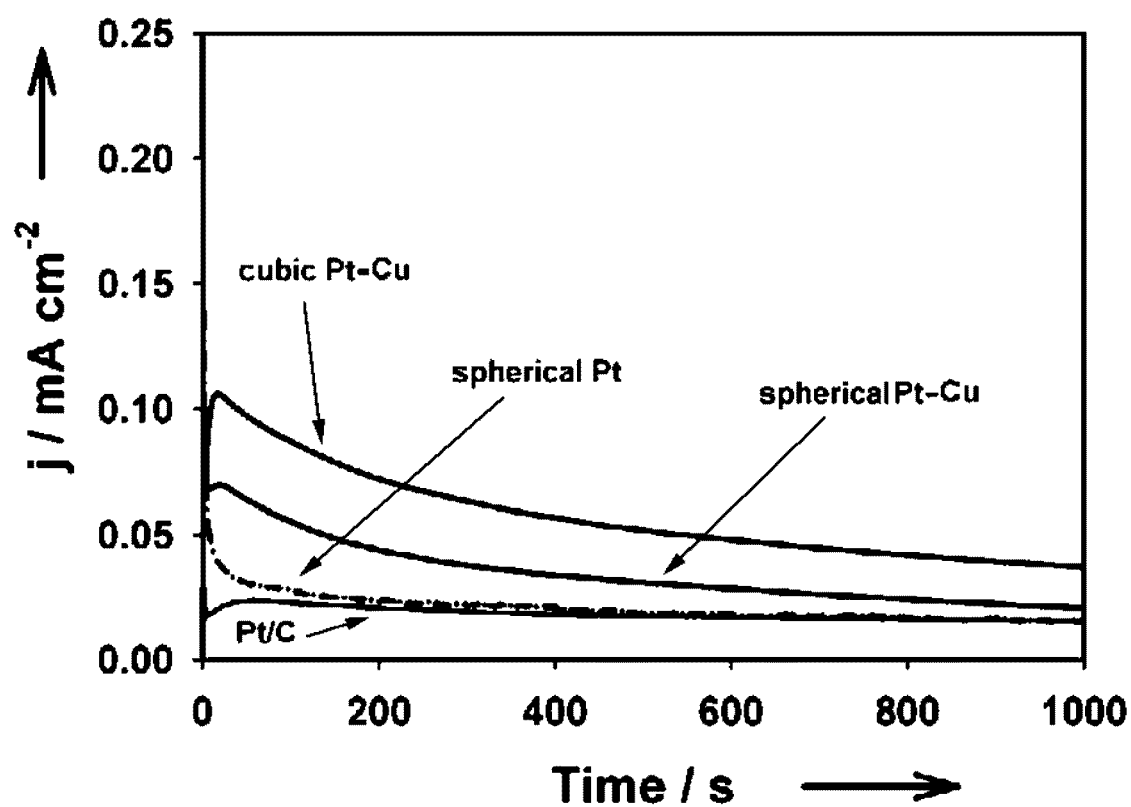
FIG. 10 shows Chronoamperometric results of methanol oxidation at 0.6 V on $Pt_{60}Cu_{40}$ nanocubes, $Pt_{60}Cu_{40}$ nanospheres, Pt nanospheres and Pt/C catalysts in 0.1 M $HClO_4$+1.0 M MeOH.

Synthesis was carried out using a standard airless procedure. In a typical experiment, 0.05 mmol of platinum (II) acetylacetonate ($Pt(acac)_2$, Gelest Inc.), 0.05 mmol of copper (II) acetylacetonate ($Cu(acac)_2$, 99.99+%), 0.5 mmol of 1,2-tetradecanediol (TDD, 90%), and 0.6 mmol of tetraoctylammonium bromide (TOAB, 98%) were gradually dissolved in vigorously stirred 1-octadecene (ODE, 7.0 mL, 90%) in a three-neck flask equipped with a condenser under an argon stream at room temperature. The mixture was then heated to 110° C. to form a clear solution, and 1.6 mL of pre-mixed oleylamine (OLA, 70%) in ODE (0.94 mmol for OLA) and 0.25 ml of pre-diluted 1-dodecanethiol (DDT, $C_{12}SH$, 98%) in ODE (0.05 mmol for DDT) were then injected into the flask in sequence. The mixed solution was subsequently heated to 230° C. and maintained at this temperature for 20 min following a quench by quickly injecting 6 mL of room-temperature toluene (BDH, 99.5%) into the system, and left for cooling-down to room temperature naturally without agitation. The Pt—Cu nanocubes were isolated by precipitating the colloids from the reaction system using a sufficient amount of ethanol (200 proof, AAPER) followed by centrifugation at 4100 rpm for 8 min The product (precipitate) was re-dispersed in 3 ml of anhydrous hexane (EMD Chemicals, 99.5%) for further characterization. All of the chemicals mentioned above were purchased from Sigma-Aldrich and used as received, except those specified. Commercial Pt/C catalysts were purchased from Johnson Matthey (40 wt % Pt).

X-ray diffraction patterns were collected using a PANalytical X'Pert X-ray powder diffractometer equipped with a Cu K$\alpha$1 radiation source ($\lambda$=0.15406 nm). A Hitachi 7000 transmission electron microscope (TEM) operated at 110 kV was used for traditional TEM imaging and a JEOL-2010 FEG TEM operated at 200 kV was used for high-resolution transmission electron microscopy imaging, selected-area electron diffraction, and X-ray energy-dispersive spectroscopy (EDS) data collection with Ni sample grids. ICP-MS analysis was conducted in Department of Geosciences, University of Houston.

Electrochemical studies were conducted using a CHI 700B electrochemical analyzer (CH Instruments, Austin, Tex.) with a two-compartment, three-electrode glass cell. A Ag/AgCl electrode saturated with KCl was used as the reference electrode and a Pt wire as the counter electrode. The potential, however, was converted to reversible hydrogen electrode (RHE). To prepare a catalyst-coated GC electrode, 4 μL of the NP colloidal suspension in hexane was spin-coated on a polished glassy carbon (GC) electrode. The NP-coated GC electrode was then subjected to Ar plasma cleaning for 10 min to remove the residues of high boiling point organic solvent and surfactants used in the synthesis. Prior to each experiment, the electrode potential was cycled between 0.04 and 1.28 V with a scan rate of 0.1 V $s^{-1}$ until a stable voltammogram was obtained in 0.1 M $HClO_4$ solution. Methanol oxidation voltammograms and chronoamperometric experiments were carried out in 0.1 M $HClO_4$+1.0 M MeOH solution. All electrolyte solutions were prepared using Milli-Q water with a resistivity of 18.2 M$\Omega$cm$^{-1}$. All of the electrochemical evaluations were conducted at room temperature (23±1° C.).

2. Synthesis of Spherical Pt—Cu Nanocrystals.

The experimental procedure is the same as that used to prepare the $Pt_{60}Cu_{40}$ nanocubes, except the absence of TOAB. On the basis of TEM image, the average size of spherical $Pt_{60}Cu_{40}$ Nanocrystals is 7.8±0.3 nm 3. Synthesis of Spherical Pt Nanocrystals.

0.197 g of Platinum (II) acetylacetonate, 10 mL of benzyl ether, 1.0 mL oleylamine and 1.0 mL of oleic acid were mixed in a three-neck flask and heated to 120° C. for 20 min under an argon stream. Temperature of the resultant clear solution was then raised to 200° C. and remained for 30 min before the system was cooled down. The products were separated by adding excessive amount of anhydrous ethanol followed by centrifugation. The isolated Pt nanocrystals were re-dispersed in anhydrous hexane, producing a colloidal suspension. Based on the TEM image, the average size of these spherical Pt NCs is 8.6±0.4 nm.

4. Discussion

The $Pt_{60}Cu_{40}$ nanocubes were prepared through simultaneous reduction of platinum (II) acetylacetonate and copper (II) acetylacetonate (molar ratio, 1/1) by 1,2-tetradecanediol TDD in ODE as solvent containing TOAB, OLA, and a trace amount of DDT. A typical transmission electron microscopic (TEM) image shows that the overall morphology of the sample displays the formation of 8.0 nm±1.0 nm (side length) $Pt_{60}Cu_{40}$ nanocubes with >90% selectivity (see FIG. 1A). The composition has been extensively investigated using various techniques including ICP-MS and EDS-TEM,[33] and the consistent results suggest that the molar ratio between Pt and Cu is 3:2. FIG. 1B is a TEM diffraction pattern of the $Pt_{60}Cu_{40}$ nanocubes, indicating a high crystallinity of these Nanocrystals and a {200}-enhanced diffraction (to be discussed below). High resolution TEM (HRTEM) image of a single $Pt_{60}Cu_{40}$ nanocube (FIG. 10C) shows clear lattice fringes with an interfringe distance of ~1.90 Å, which is corresponding to the lattice spacing of $Pt_{60}Cu_{40}$ {200} planes. FIG. 2 shows a powder XRD pattern of these $Pt_{60}Cu_{40}$ nanocubes deposited on a normal sample holder, displaying the typical peaks which are in agreement with those of a standard $Pt_{60}Cu_{40}$ pattern (refer to JCPDS ICDD card 48-1549). No peak from a single component of either Pt or Cu was detected, confirming the presence of only single phase PtCu alloy. Note that, as shown in FIG. 1B, the relative intensity of the 200 diffraction peak is much stronger than that of the 111 peak with an approximate ratio of 240:100 in comparison with a ratio of 65:100 in a face centered cubic (fcc) PtCu alloy pattern (JCPDS ICDD card 48-1549), indicating that the NC pattern was (100) textured. It is worth noting that assembly of these nanocubes apparently results in a further enhancement of the 200 peak as shown in FIG. 2 (inset), for which the sample suspension was deposited on a polished {100} silicon wafer prior to the XRD measurement. As discussed previously,[34] this observation suggests the existence of $Pt_{60}Cu_{40}$ nanocube layer, further verifying the dominance of cubic $Pt_{60}Cu_{40}$ in the product.

Among all of the experimental parameters, the amount of TOAB seems to be important for success in the nanocube preparation. In the absence of TOAB, only faceted polyhedral Nanoparticles with a broad size-distribution are produced (FIG. 5A). Addition of 0.3 mmol TOAB in the typical system (see Experimental section) results in much less shape-controlled polyhedral Nanoparticles containing ~40% cube-like Nanoparticles with a size range of 2.5 to 7.8 nm (FIG. 5B). If the amount of TOAB is increased to 1.0 mmol, the final products are composed of aggregated octapods and tetrahedra with sizes of 20-30 nm (FIG. 5C). It therefore demonstrates that TOAB plays the most important role in controlling the size of the $Pt_{60}Cu_{40}$ nanocubes. The Br$^-$ ions from TOAB appear to effectively stabilize the {100} faces of $Pt_{60}Cu_{40}$ Nanocrystals, which lowers the total surface energy of {100} and induces the evolution of nanocubes. Such function of Br$^-$ in metallic nanocube evolution has been elucidated previously.[35-37] This effectiveness can be further confirmed by alternatively replacing TOAB with the same amount of cetyltrimethylammonium bromide (CTAB), although the latter leads to a little degradation of the product quality. $Pt_{60}Cu_{40}$ Nanocrystals synthesized using CTAB exhibit the following characteristics: having a lower proportion of nanocubes mixed with nanotetrahedra, being easily aggregated, and containing a considerable amount of small Nanoparticles with a size of less than 2 nm (FIG. 6). This relatively low quality is possibly resulted from a low compatibility of CTAB with the solvent used. Unlike TOAB, it was realized that OLA plays another significant but different role. Without OLA, serious aggregates of the Nanocrystals were observed (FIG. 6), indicating that OLA is indispensable for the stabilization of the colloidal Nanocrystals. If too much of OLA (e.g. 1.8 mmol) is used, however, aggregated Nanocrystals with enlarged size can be produced (FIG. 7B), suggesting that less Pt is released for the nucleation because of a stronger binding of OLA.[38, 39] We therefore infer that appropriate amount of OLA is essential to tentatively stabilize the clusters of Pt as well as Cu in the initial stage of the reaction, and the growth of $Pt_{60}Cu_{40}$ nanocubes is synergistically controlled by both OLA and TOAB. In order to harvest high-quality $Pt_{60}Cu_{40}$ nanocubes, the ratio of OLA/TOAB was optimized in a range of 1.5 to 2.0.

In addition to the cooperative effect of TOAB and OLA, morphology of the Nanocrystals is also strongly affected by DDT that has an ability of fine-tuning the reduction rate between Pt(II) and Cu(II). In the absence of DDT, most of Pt—Cu NCs produced are 1-3 nm in size and irregular in shape with a mixture of a few ~4 nm $Pt_{60}Cu_{40}$ nanocubes (FIG. 8A). Under the typical experimental conditions, only 0.05 mmol of DDT is required to generate perfect $Pt_{60}Cu_{40}$ nanocubes. Excessive DDT (e.g. 0.075 mmol) results in growth of some partially filled nano-octapods (>60%) with a size of 13-19 nm and some flower-like NCs (FIG. 8B). We have specifically examined the decomposition temperature of a single Cu- or Pt-precursor in the same system. Without DDT, Pt- or Cu-precursors start to decompose at 180 or 230° C., respectively, in comparison with the initial decomposition temperature of ~215° C. in a typical Pt—Cu-alloy synthesis. It is accordingly concluded that DDT acts as a co-reduction agent accelerating the reduction rate of Cu(II) and decreasing that of Pt(II). As a mild reducing agent, TDD can facilitate the nucleation process and is also necessary in the formation of $Pt_{60}Cu_{40}$ nanocubes with uniform size. In the absence of TDD, the grown NCs exhibited a shape of partially filled octapod with sizes of 10-13 nm (FIG. 8A). Once a small amount of TDD was introduced, the particle size significantly decreased. For instance, the size of $Pt_{60}Cu_{40}$ nanocubes prepared with 1.0 mmol of TDD could be reduced to 5-10 nm (FIG. 8B).

To explore the growth mechanism, the intermediate was systematically analyzed with a precise tuning of the relative doses of TDD and DDT. In the typical synthesis, the reaction (with 0.5 mmol TDD and 0.05 mmol DDT) preceded too fast to trap the intermediates. When the TDD and DDT doses were varied to 0.25 and 0.07 mmol, respectively, it was possible to extract the intermediate NCs successfully once the system temperature just approached 223° C. FIG. 3A shows a TEM image of the instantaneous product which is believed to be the intermediate while the formed nucleating seeds were converting to nanocubes, as indicated by a quick color-change of the solution from light-yellow to dark-brown at this crucial point. As illustrated, most of the NCs (>90%) are octapods with an average size of 6-8 nm, and some are tetrahedra with a side length of 7-8 nm It is believed that the evolution consists of a nucleation stage and a further Ostwald ripening growth.[40, 41] In the short nucleation stage, kinetic equilibrium, that is, a rapid deposition of metallic clusters into seeds, may be the key driving force in the growth due to the supersaturation of the precursors.[42] For an fcc structure, it has also been reported that {100} crystallographic facets generally possess higher surface energy than {111} do.[43, 44] Study on bulk PtCu indicates that {100} are higher-surface-energy faces due to atomic interdiffusion as well as Cu segregation on {100}.[45] This results in an anisotropic growth, making the crystal growth rate in {100} direction much faster than that in other directions. In order to minimize the total surface energy, the tiny seeds have to be developed as nano-octapods or nanotetrahedra which are bounded by {111} low-surface-energy facets, whereas the {100} planes are rapidly eliminated. When the seeds are completely generated, the difference of total surface energy on each crystal surface will thermodynamically dominate the shape evolution due to the existence of well-developed crystal facets and the consumption of feedstock. As discussed before, the order of total surface energy on various crystallographic facets in solution may be altered by varying the composition of mixed capping ligands as the binding capability of each capping ligand on various crystal facets may not be the same (For example, bromide of TOAB can selectively stabilize the {100} faces). With an appropriate tuning of the ligand composition, {100} can be the lowest-surface-energy facets, and remained as the terminal planes of cubic Nanoparticles. In this case, the further reduced Pt and Cu atoms will be energetically favorable for filling into the spaces between the octapod branches and the particles will eventually develop into nanocubes with some traces of partially filled $Pt_{60}Cu_{40}$ nano-octapods (FIG. 3A). Nevertheless, those tetrahedral seeds will have to remain their morphology throughout because it may require much higher energy to generate an intermediate structure for the conversion between the nanotetrahedra to nanocubes. In very rare case, multi-twinned particles with decahedral shape as a minor constituent may be simultaneously generated from the nucleation. This type of seeds may result in a growth of nanorods with five-fold twinned rod structure as discussed previously.[41, 46-49] It is worth mentioning that the nucleation and even additional growth process are actually pretty fast. Under present conditions, it only needs around 4 min to evolve "crepe-shaped" $Pt_{60}Cu_{40}$ nanocubes (FIG. 3B).

As a demonstration of the catalytic activity in methanol oxidation, FIG. 4A illustrates a cyclic voltammogram (CV) of these $Pt_{60}Cu_{40}$ nanocubes in 0.1 M $HClO_4$+1.0 M MeOH. For a comparison, results from spherical $Pt_{60}Cu_{40}$ and Pt Nanocrystals with similar sizes are also included. The current density was calculated with respect to the Pt surface area measured from the hydrogen adsorption/desorption charges. Clearly, $Pt_{60}Cu_{40}$ nanocubes show the highest methanol oxidation current density. For example, the maximum peak value of methanol oxidation current density on $Pt_{60}Cu_{40}$ nanocubes is 4.7 mA cm$^{-2}$, whereas that for the Pt Nanoparticles is 1.1 mA cm$^{-2}$. Higher methanol oxidation current density on $Pt_{60}Cu_{40}$ nanocubes was further confirmed by the chronoamperometric measurements performed at 0.8 V (FIG. 4B). As can be appreciated, the catalytic activity follows the order, $Pt_{60}Cu_{40}$ nanocube>$Pt_{60}Cu_{40}$ nanosphere>Pt nanosphere, with current density values of 2.1, 1.5 and 0.4 mA cm$^{-2}$, respectively, at 100 s and 0.8 V. The same activity order was also observed at 0.6 V (FIG. 10). The activity on Pt nanospheres is very similar to that of commercial Pt/C catalysts (FIG. 10). Interestingly, the methanol oxidation activity of $Pt_{60}Cu_{40}$ nanospheres decreased at longer period of time, and eventually reached the same level as that of Pt nanospheres. These results apparently indicate that the {100}-confined $Pt_{60}Cu_{40}$ nanocubes offer a higher electrocatalytic activity for methanol oxidation than those with mixed crystallographic facets do. The higher catalytic activity of $Pt_{60}Cu_{40}$ nanocubes may be attributed to the electronic structure modification of Pt surface with the presence of Cu, as commonly being observed in transition metal Pt alloys.[50-52]

High-quality $Pt_{60}Cu_{40}$ nanocubes are successfully prepared from a hot organic solution. All of the synthetic conditions, such as the ratio of OLA/TOAB as well as the doses of DDT and TDD, were entirely optimized for the formation of $Pt_{60}Cu_{40}$ nanocubes. The mechanism of nucleation and NC growth was explored and discussed based on observation of the intermediate Nanoparticles when partial reaction parameters were precisely tuned. Electrochemical catalytic activity of these $Pt_{60}Cu_{40}$ nanocubes for methanol oxidation was also evaluated, in comparison with those of spherical $Pt_{60}Cu_{40}$ Nanocrystals and Pt NCs with similar sizes, demonstrating a superior electrocatalytic activity and implying that the {100}-terminated $Pt_{60}Cu_{40}$ nanocubes offer a higher activity for methanol oxidation reaction than those with mixed crystallographic facets do.

REFERENCES AND NOTES

Incorporated Herein by Reference

[1] R. Narayanan, M. A. El-Sayed, J. Phys. Chem. B 2003, 107, 12416-12424.
[2] J. Zhang, M. B. Vukmirovic, Y. Xu, M. Mavrikakis, R. R. Adzic, Angew. Chem. Int. Ed. 2005, 44, 2132-2135.
[3] M. S. El-Deab, T. Ohsaka, Angew. Chem. Int. Ed. 2006, 45, 5963-5966.
[4] L. Pino, V. Recupero, S. Beninati, A. K. Shukla, M. S. Hegde, P. Bera, Appl. Catal. A 2002, 225, 63-75.
[5] A. T. Bell, Science 2003, 299, 1688-1691.
[6] A. Roucoux, J. Schulz, H. Patin, Chem. Rev. 2002, 102, 3757-3778.
[7] K. R. Williams, G T. Burstein, Catalyt. Taday 1997, 38, 401-410.
[8] C. Wang, H. Daimon, Y. Lee, J. Kim, S. Sun, J. Am. Chem. Soc. 2007, 129, 6974-6975.
[9] R. Narayanan, M. A. El-Sayed, J. Am. Chem. Soc. 2008, 126, 7194-7195.
[10] R. Narayanan, M. A. El-Sayed, Nano. Lett. 2004, 4, 1343-1348.
[11] N. Tian, Z.-Y. Zhou, S.-G Sun, Y. Ding, Z. L. Wang, Science 2007, 316, 732-735.
[12] N. M. Markovic, H. A. Gasteiger, J. Philip N. Ross, J. Phys. Chem. 1995, 99, 3411-3415.
[13] K. Kinoshita, J. Electrochem. Soc. 1990, 137, 845-848.
[14] C. Wang, H. Daimon, T. Onodera, T. Koda, S. Sun, Angew. Chem. Int. Ed. 2008, 47, 1-5.
[15] H. Lee, S. E. Habas, S. Kweskin, D. Butcher, G A. Somorjai, P. Yang, Angew. Chem. Int. Ed. 2006, 45, 7824-7828.
[16] H. Song, E Kim, S. Connor, G A. Somorjai, P. Yang, J. Phys. Chem. B 2005, 109, 188-193.
[17] T. S. Ahmadi, Z. L. Wang, T. C. Green, A. Henglein, M. A. El-Sayed, Science 1996, 272, 1924-1925.
[18] J. Chen, T. Herricks, Y. Xia, Angew. Chem. Int. Ed. 2005, 44, 2589-2592.
[19] X. Teng, H. Yang, Nano. Lett. 2005, 5, 885-891.
[20] B. Mayers, X. Jiang, D. Sunderland, B. Cattle, Y. Xia, J. Am. Chem. Soc. 2003, 125, 13364-13365.
[21] J. Chen, T. Herricks, M. Geissler, Y. Xia, J. Am. Chem. Soc. 2004, 126, 10854-10855.
[22] T. Jacob, W. A. G III, J. Phys. Chem. B 2004, 108, 8311-8323.
[23] K.-W. Park, J.-H. Choi, B.-K. Kwon, S.-A. Lee, Y.-E. Sung, H.-Y. Ha, S.-A. Hong, H. Kim, A. Wieckowski, J. Phys. Chem. B 2002, 106, 1869-1877.
[24] U. A. Paulus, A. Wokaun, G. G Scherer, T. J. Schmidt, V. Stamenkovic, N. M. Markovic, P. N. Ross, Electrochim Acta 2002, 47, 3787-3798.

[25] Z. Liu, C. Yu, I. A. Rusakova, D. Huang, P. Strasser, Top Catal. 2008, 49, 241-250.
[26] H. A. Gasteiger, S. S. Kocha, B. Sompalli, E T. Wagner, Appl. Catal. 2005, 56, 9-35.
[27] V. R. Stamenkovic, B. S. Mun, M. Arenz, K. J. J. Mayrhofer, C. A. Lucas, G Wang, P. N. Ross, N. M. Markovic, Nat. Mater. 2007, 6, 241-247.
[28] V. Stamenkovic, B. S. Mun, K. J. J. Mayrhofer, P. N. Ross, N. Markovic, J. Rossmeisl, J. Greeley, J. K. Nørskov, Angew. Chem. Int. Ed. 2006, 45, 2897-2901.
[29] E. Arola, C. J. Barnes, R. S. Rao, A. Bansil, P. M, Surf. Sci. 1991, 249, 281-288.
[30] N. Toshim, Y. Wangl, Langmuire 1994, 10, 4574-4580.
[31] T. Komatsu, A. Tamura, J. Catal. 2008, 258, 306-314.
[32] R. E. Schaak, A. K. Sra, B. M. Leonard, R. E. Cable, J. C. Bauer, Y.-F. Han, J. Means, W. Teizer, Y. Vasquez, E. S. Funck, J. Am. Chem. Soc. 2005, 127, 3506-3515.
[33] As detailed in supporting information, the average molar ratio of Pt/Cu is 0.598:0.402 (±0.018) on the basis of EDS (TEM) determination on five samples. ICP-MS measurement supports this result, with an average molar ratio (Pt/Cu) of 0.64:0.36 (±0.02). The average molar ratio of Pt/Cu evaluated using EDS (SEM) is also close to this composition.
[34] W. Lu, J. Fang, K. L. Stokes, J. Lin, J. Am. Chem. Soc. 2004, 126, 11798-11799.
[35] A. Filankembo, S. Giorgio, I. Lisiecki, M. P. Pileni, J. Phys. Chem. B 2003, 107, 7492-7500.
[36] Y. Zhang, M. E. Grass, J. N. Kuhn, E Tao, S. E. Habas, W. Huang, P. Yang, G. A. Somorjai, J. Am. Chem. Soc. 2008, 130, 7492-7500.
[37] F.-R. Fan, D.-Y. Liu, Y.-F. Wu, S. Duan, Z.-X. Xie, Z.-Y. Jiang, Z.-Q. Tian, J. Am. Chem. Soc. 2008, 130, 6949-6951.
[38] R. Romeo, G Arena, L. M. Scolaro, M. R. Plutino, G Bruno, F. Nicolo, Inorg. Chem. 1994, 33, 4029-4037.
[39] S. Saita, S. Maenosono, Chem. Mater. 2005, 17, 6624-6634.
[40] C. B. Murray, C. R. Kagan, M. G Bawendi, Annu. Rev. Mater. Sci. 2000, 30, 545-610.
[41] Y. Xiong, Y. Xia, Adv. Mater. 2007, 19, 3385-3391.
[42] J. Zhang, K. Sun, A. Kumbhar, J. Fang, J. Phys. Chem. C 2008, 112, 5454-5458.
[43] Z. L. Wang, J. Phys. Chem. B 2000, 104, 1153-1175.
[44] J.-M. Zhang, E Ma, K.-W. Xu, Appl. Surf. Sci. 2004, 229, 34-42.
[45] R. Belkhou, J. Thiele, C. Guillot, Surf. Sci. 1997, 377-379, 948-952.
[46] J. L. Elechiguerra, J. Reyes-Gasga, M. J. Yacaman, J. Mater. Chem. 2006, 16, 3906-3919.
[47] H. Chen, Y. Gao, H. Zhang, L. Liu, H. Yu, H. Tian, S. Xie, J. Li, J. Phys. Chem. B 2004, 108, 12038-12043.
[48] C. Ni, P. A. Hassan, E. W. Kaler, Langmuire 2005, 21, 3334-3337.
[49] C. J. Johnson, E. Dujardin, S. A. Davis, C. J. Murphy, S. Mann, J. Mater. Chem. 2002, 12, 1765-1770.
[50] Tong, Y, Kim, H. S., Babu, P. K., Waszczuk P., Wueckowski, A., Oldfield, E. J. Am. Chem. Soc. 2002, 124, 468-473.
[51] M. Watanabe, K. Tsurumi, T. Mizukami, T. Nakamura, P. Stonehart, J. Electrochem. Soc. 1994, 141, 2659-2668.
[52] E. Antolini, J. R. C. Salgado, E. R. Gonzalez, Appl. Catal. B 2006, 63, 137-149.

EXAMPLE 2

Shape-control synthesis of metallic nanocrystals (NCs) has received extensive interest since the catalytic performances of nanoparticles (NPs) have been found to be strongly related with the facets terminated the surface of the particles.[1-6] For example, tetrahexahedral platinum (Pt) NCs exhibit an unusual high electro-oxidation activity for formic acid and ethanol compared with spherical Pt Nanocrystals.[5] $Pt_{60}Cu_{40}$ nanocubes (NCbs) exhibit superior electrochemical activity towards methanol oxidation reaction compared with similar sized spherical Pt NCs.[6] On the other hand, it is an urgent task to develop substitutes for the pure Pt-catalyst due to the high-cost as well as the rarity of Pt. In recent years, less-expensive Pt-based binary alloy NPs have been elaborately prepared and intensively studied.[7-11] It has been realized that, in addition to particle shape, the alloy composition also acts an extremely important character with respect to the catalytic activity.[11-16] Nevertheless, it is still a great challenge to synthesize high-quality Pt-based bimetallic nanocubes with precisely controlled composition. The present example provides methods for preparing various compositions of $Pt_xCu_{100-x}$ NCbs through a versatile colloidal method.

Experimental Details

Chemicals. Copper (II) acetylacetonate (Cu(acac)2, 99.99%), tetraoctylammonium bromide (TOAB, 98%), tungsten hexacarbonyl ($W(CO)_6$, 97%), oleylamine, (OLA, 70%), 1-dodecanethiol ($C_{12}SH$, DDT, 98%) and 1-octadecene (ODE, 90%) were purchased from Sigma-Aldrich without further purification. Platinum (II) acetylacetonate (Pt $(acac)_2$), and 1,2-tetradecanediol (TDD) are products of Gelest and Tokyo Kasei Kogyo Co. and were used as received. $HClO_4$ was from GFS Chemicals (double distilled), and formic acid was from J. T. Baker (88%).

Synthesis of $Pt_{80}Cu_{20}$ nanocubes. The synthesis was carried out using standard airless procedures. 0.09 mmol of $Pt(acac)_2$, 0.01 mmol of $Cu(acac)_2$, 0.5 mmol of TDD and 1.23 mmol of TOAB were mixed in 7.0 ml ODE. The mixture was heated to 110° C. with vigorous stirring under the protection of Argon stream. 0.61 ml of prepared OLA in ODE (0.36 mmol for OLA) and 0.28 ml of prepared $C_{12}SH$ in ODE (0.06 mmol for $C_{12}SH$) were injected into the mixture in sequence. The color of the solution turned bright yellow once all of the chemicals completely were dissolved in the solvent, deeper dark with increasing the temperature, and finally black at around 210° C. After maintaining the reaction at 220° C. for 20 min, few drops of OLA and 6.0 ml of toluene were injected in order to quench the reaction.

These colloids were cooled to room temperature by quickly removing the heating source, and then isolated by adding 40 mL of ethanol (200 proof, AAPER) followed by centrifugation. The precipitate was re-dispersed in 3 ml of hexane for further characterization.

Synthesis of other $Pt_xCu_{(100-x)}$ (x=54, 60, and 70) nanocubes. The synthesis procedure is the same with the synthesis of $Pt_{80}Cu_{20}$ NCbs except the different doses of chemical agents and reaction temperature listed in Table 1.

Synthesis of Pt nanocubes. 0.05 mmol of platinum (II) acetylacetonate, 8.0 mL of oleylamine and 2.0 mL of oleic acid were loaded into a three-neck flask and heated to 130° C. under an argon stream. 0.14 mmol of $W(CO)_6$ was then added into the solution and the temperature was subsequently raised to 240° C. and kept for 30 min with stiffing. The resultant products were isolated by centrifugation washed with anhydrous hexane or chloroform for several cycles. The Pt NCbs were finally re-dispersed in 5 ml of hexane for further characterization.

Procedures of electrochemical measurement. Following the synthesis, the NCbs were subjected to a chemical cleaning procedure,[30] and designed to remove any organic residue from their surface. One mg of the as-cleaned catalysts was mixed and homogenized with 1.0 mL of ethanol in a sealed vial under continuous sonication for at least 30 min In order to prevent an agglomeration of the NPs during sonication, the temperature was kept low by steady addition of ice. When the particles were uniformly dispersed in the entire volume of the solvent, 20 µL of the suspension was taken out at a time, and was spread on a mechanically polished (down to 0.05 µm) glassy-carbon electrode (geom. area of 0.196 cm$^2$). Thus, one by one, droplets of the suspension were repeatedly placed on the electrode surface (carefully keeping their overall count), followed by evaporation of the ethanol at room temperature. This procedure allowed for homogeneous spreading of known amount of NCbs on the electrode surface. As a result, a strongly adhering, free of organic additives and yet mechanically stable catalyst layer formed on the glassy-carbon support. Cyclic Voltammetry measurements were carried out in a conventional three-electrode cell by using a Pine bipotentiostate (model AFCBP1). The counter electrode was a Pt wire, and the reference electrode was saturated Hg/Hg$_2$SO$_4$ (Princeton Applied Research). A 0.1 M of HClO$_4$ aqueous solution served as electrolyte for the H$_{UPD}$ measurements carried out for determining the electrochemically active surface area (ECASA) of the catalysts. Formic acid oxidation measurements were conducted in an aqueous solution containing 0.1 M HClO$_4$ and 2.0 M HCOOH. All solutions were prepared using Barnstead Nanopure® water with a resistivity of 18.3 MΩ·cm. The electrolytes were purged using a high-purity N$_2$ for at least 30 min before each experiment and throughout all the measurements. All of electrochemical measurements were conducted at room temperature (23±1° C.).

Sample Characterization

TEM images of the samples were obtained from a Hitachi 7000 transmission electron microscope at 110 kV. Energy-dispersive X-ray spectroscopic (EDS) data were collected from a JEOL-2010 FEG transmission electron microscope (TEM). The X-ray diffraction (XRD) patterns were recorded on a Philips X'Pert PANanalytical X-ray diffractometer equipped with a Cu Kα1 radiation source (λ=0.15406 nm).

Results

Pt$_x$Cu$_{100-x}$ NCbs were synthesized.[6] Generally, platinum (II) acetylacetonate (Pt(acac)$_2$) and copper (II) acetylacetonate (Cu(acac)$_2$) in 1-octadecene (ODE) were co-reduced by 1,2-tetradecanediol (TDD) in the presence of tetraoctylammonium bromide (TOAB), oleylamine (OLA) and 1-dodecanethiol (DDT). NCbs with various compositions were prepared by precisely tuning the ratio of metal precursors, the amount of stabilizing/coordination agents and the reaction temperature. It was determined that the compositions and morphologies of the products were highly dependent upon the experimental conditions. Table 1 summarizes these experimental parameters.

TABLE 1

Experimental conditions for preparing Pt$_x$Cu$_{(100-x)}$ nanocubes with different compositions[a]

| Pt$_x$Cu$_{100-x}$ | Pt (acac)$_2$ | Cu (acac)$_2$ | TOAB | OLA | DDT | TDD | Temp./° C. | Time/min |
|---|---|---|---|---|---|---|---|---|
| Pt$_{80}$Cu$_{20}$ | 0.09 | 0.01 | 1.23 | 0.36 | 0.06 | 0.50 | 220 | 20 |
| Pt$_{70}$Cu$_{30}$ | 0.08 | 0.02 | 1.10 | 0.36 | 0.05 | 0.50 | 220 | 20 |
| Pt$_{60}$Cu$_{40}$[b] | 0.05 | 0.05 | 0.60 | 0.94 | 0.05 | 0.50 | 230 | 20 |
| Pt$_{54}$Cu$_{46}$ | 0.04 | 0.05 | 0.58 | 0.90 | 0.04 | 0.50 | 230 | 20 |

[a]unit: mmol unless indicated in table.
[b]as a reference, data were from a previous report (see Ref. 6).

It was reported that different Pt-based bimetallic alloys demonstrate diverse nucleation and growth mechanisms.[11,17-20] First of all, the as-prepared NCbs may be evolved from Pt atoms as nucleation seeds because only NCbs with dominant Pt component could be produced. In addition, precursors with a Pt/Cu feeding ratio of 1:1 only produce Pt$_{60}$Cu$_{40}$ NCbs. To further increase the Pt-component, much higher amount of Pt-precursor is unstoichiometrically required, e.g. Pt$_{70}$Cu$_{30}$ and Pt$_{80}$Cu$_{20}$ nanocubes need 4:1 and 9:1 of Pt:Cu inputs, respectively. Secondly, the amounts of the stabilizers (TOAB and OLA) and coordination agent (DDT) also need to be finely tuned in order to generate NCbs with desired composition. Among these, it is believed that the amount of TOAB is important to ensure the high-quality NCbs.[6] Pt$_x$Cu$_{100-x}$ NCbs with higher Pt-component require more TOAB. A good example of this is that, 0.58 mmol TOAB was enough to stabilize Pt$_{54}$Cu$_{46}$ NCbs, whereas as high as 1.23 mmol of TOAB was necessary to develop Pt$_{80}$Cu$_{20}$ NCbs. OLA, as the other stabilizer, also plays an important role in the present system. Our results indicate that the alloy NCbs with higher Pt-component needs less amount of OLA. For example, 0.9 and 0.94 mmol of OLA was required to produce Pt$_{54}$Cu$_{46}$ and Pt$_{60}$Cu$_{40}$ NCbs, respectively. However, 0.36 mmol OLA was sufficiently enough when both Pt$_{70}$Cu$_{30}$ and Pt$_{80}$Cu$_{20}$ NCbs were prepared. Given the observation for all the samples, deficiency of OLA is hard to stabilize the NPs in the colloidal system, whereas excessive OLA results in larger NPs with fewer nanocubes. OLA and TOAB offer a synergistic stabilizing effect on developing high-quality NCbs. Thirdly, it shows that the product morphology also directly associates with the amount of coordination agent DDT, which can synchronize the reduction rate of Pt and Cu ions during the reaction. The results indicate that the amount of DDT varies in an extremely narrow region in the present system. For Pt$_{54}$Cu$_{46}$ and Pt$_{80}$Cu$_{20}$ NCbs, 0.04 and 0.06 mmol of DDT were used to facilitate the uniform products. For NCbs with 54%<Pt<80%, 0.05 mmol of DDT was enough. Furthermore, it reveals that less DDT produces smaller NPs with irregular morphology, whereas excessive DDT leads to larger NPs. Next, TDD as a reducing agent can accelerate the nucleation rate, which is also essential in the evolution of high-quality NCbs. In our case, a constant amount of TDD (0.5 mmol) served for preparation of all the NCbs. It is worth mentioning that the effect of TDD on NP growth is opposite to that of DDT. Insufficient TDD leads to produce larger partial-filled octapods, whereas excessive TDD increases the population of smaller nanocubes and accordingly broadens the particle size distribution. Finally, the reaction temperature and time are also sensitive to the quality of NCbs. They should be kept at 230° C. for 20 min to prepare the best Pt$_{54}$Cu$_{46}$ and Pt$_{60}$Cu$_{40}$ NCbs, and 220° C. for 20 min for Pt$_{70}$Cu$_{30}$ and Pt$_{80}$Cu$_{20}$. For Pt$_{54}$Cu$_{46}$ and Pt$_{60}$Cu$_{40}$ systems, higher temperature (up to 250° C.) results in larger NPs with less nanocubes and lower temperature (down to 210° C.) leads to, certain amount of smaller Nanoparticles with irregular shape. As pointed, moreover, lower reaction temperature favors formation of NCbs containing higher Pt constituent.

FIG. 11 shows X-ray diffraction (XRD) patterns of five samples with different compositions including pure Pt. The well-defined (200) peaks suggest that most of the NPs exhibit cubic shape and are deposited perfectly flat on the surface-polished silicon wafer. The patterns shift to higher positions of 2θ with increasing copper composition is in agreement with Vegard's law.[21, 22] On the basis of the full-width-at-half-maximum (FWHM), the crystalline size for each was estimated as 7-9 nm which is in good agreement with the TEM observation. The right panels in FIG. 11 show a 100× 100 nm² square area of TEM images (also see FIG. 14), indicating that all five samples are mainly composed of NCbs with narrow size-distributions (FIG. 14). The compositions were evaluated using an energy dispersive X-ray spectroscopy (EDS), and the results are presented in FIG. 15.

As presented in FIG. 16, typical features for hydrogen underpotential formation/stripping (HUPD)[23] are clearly observed in the CV curves that were measured for all catalysts at a sweep rate of 50 mV/s in 0.1 M $HClO_4$ solution. The electrochemically active surface area (ECASA) for each electrode was calculated from the corresponding charge of $H_{UPD}$ (also known as "hydrogen adsorption") peak divided by the formation charge of a $H_{UPD}$ monolayer deposited on polycrystalline Pt surface (210 μC/cm²).[15] ECASA values determined accordingly were used for normalization of the voltammetric currents, corresponding to the formic acid electrooxidation on the catalyst surfaces. As presented in FIG. 13B, the CV curve for formic acid electrooxidation on $Pt_{80}Cu_{20}$ nanocubes is virtually identical with those obtained on pure metallic (Pt, Pd) surfaces. CV curves for all catalyst compositions were depicted in FIG. 17. Generally, the presence of hysteresis between the positive and negative scans in those curves is an indication of CO adsorption. Also, a sharp increase of the current at 0.33V and decrease at 0.44 V when the potential was swept in negative and positive direction is attributed to the OH⁻ desorption and adsorption process, respectively. In addition, the electrocatalytic activity in this work is defined as a maximum current density derived from the negative scan of the CV curves at a sweep rate of 50 mV/s, measured in 0.1 M $HClO_4$+2.0 M HCOOH. It should be noted that the catalytic activity of the NCb catalysts examined herein is about an order of magnitude higher in comparison with that of Pd NPs,[24] most likely owing to the nafion-free route in catalyst preparation.

Having a narrow distribution of both the size and the shape, it is anticipated that the electrochemical activity of these NCbs towards formic acid oxidation may directly depend on the NC composition. FIG. 12A illustrates a compositional dependence of the peak current density towards formic acid oxidation from these $Pt_xCu_{100-x}$ (x=54-80 at. %) NCbs. Furthermore, it was confirmed that the electrocatalytic activity of $Pt_{80}Cu_{20}$ NCbs towards formic acid oxidation exceeds that determined from the pure Pt nanocubes, as shown in FIG. 12B. The enhanced activity of this bimetallic alloy could be due to a shift of the onset potentials of OH⁻ electrosorption to more positive as a result of alloying, owing to a lower tendency of alloy surface to chemisorb OH⁻.[25] The OH⁻ is a poison for formic acid oxidation, as it likely blocks adjacent vacant surface sites, needed for the decomposition of formate (an intermediate in the oxidation process) to $CO_2$.[26, 27] In addition, FIG. 12A clearly indicates a decreasing activity of the catalysts with the increase of the copper content in the $Pt_xCu_{100-x}$ NCbs. This tendency is in agreement with the negative shift of the onset potential for OH⁻ electrosorption with the increase of the Cu content of the samples, as it is evidenced in FIG. 17.

Figure 13A:
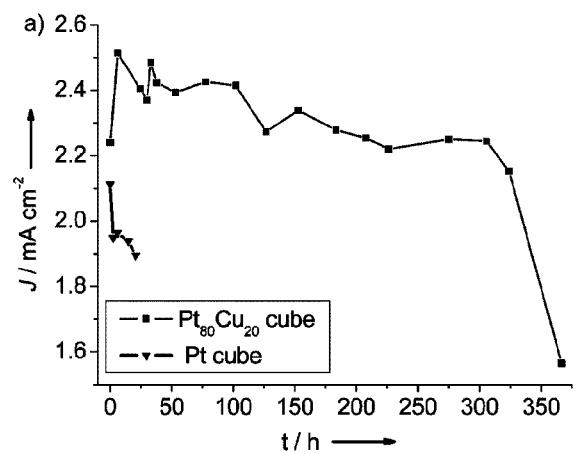
FIG. 13A shows the I-t characteristic of $Pt_{80}Cu_{20}$ and Pt nanocubes.
Figure 13B:
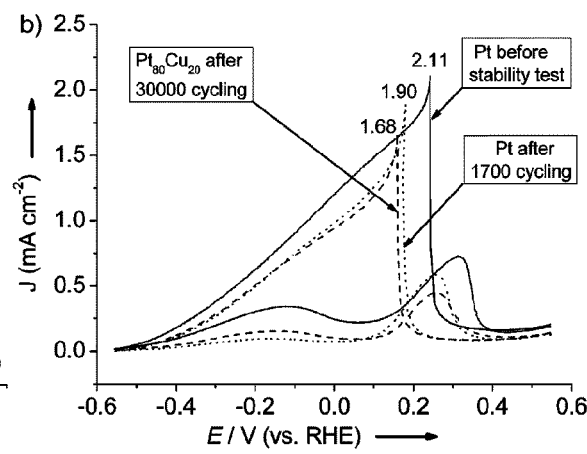
FIG. 13B shows cyclic voltammograms of formic acid oxidation on Pt nanocubes before and after stability test and on $Pt_{80}Cu_{20}$ nanocubes after stability test.
Figure 15A:
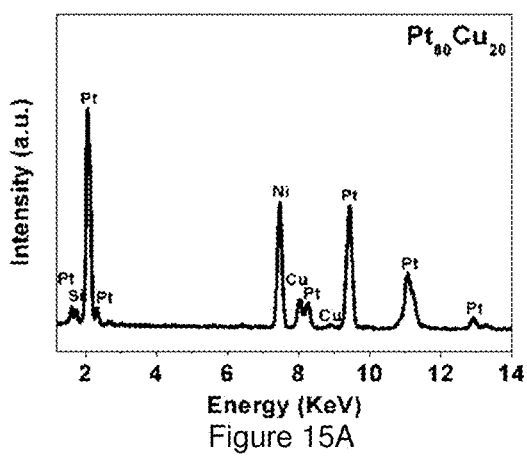
FIG. 15 shows EDS spectra of $Pt_xCu_{(100-x)}$ nanocubes.
Figure 15B:
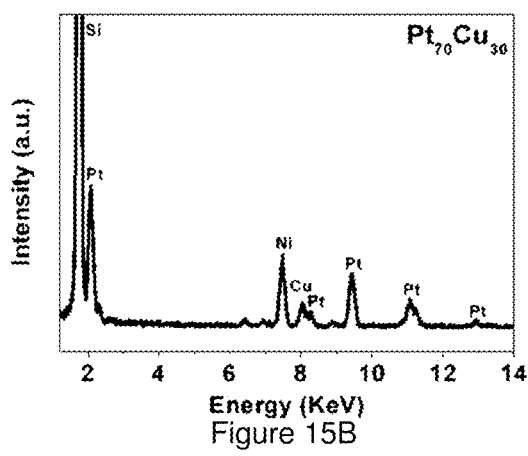
Figure 15C:
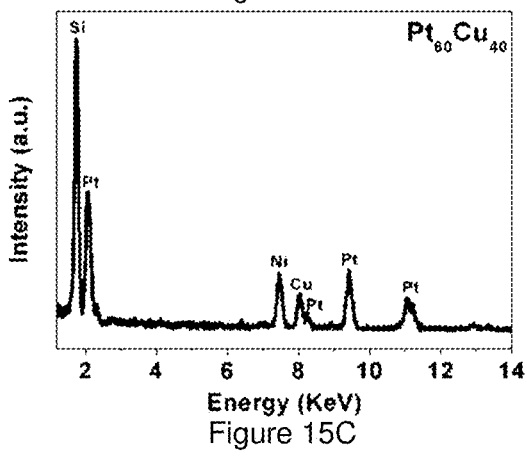
Figure 15D:
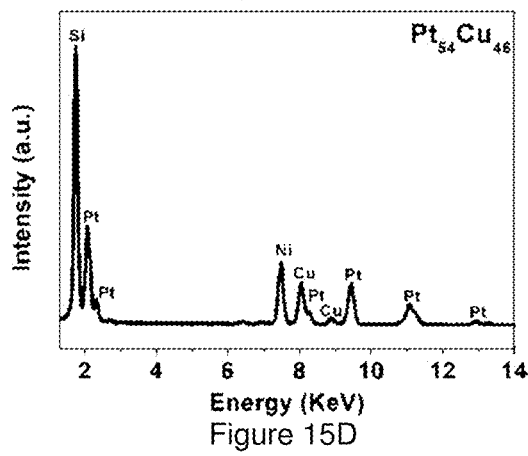
Figure 16A:
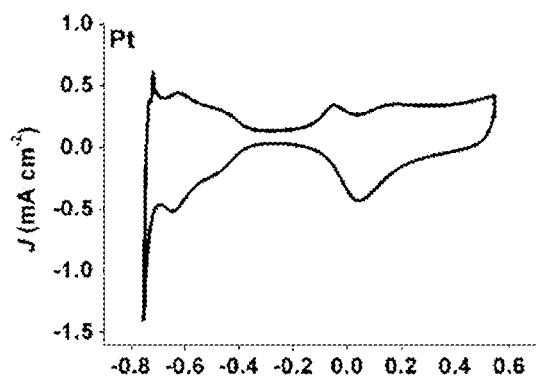
FIG. 16 shows CV diagrams for Pt and $Pt_xCu_{(100-x)}$ nanocubes of FIG. 12A in 0.1 M $HClO_4$ at the sweep rate of 50 mV $s^{-1}$.
Figure 16B:
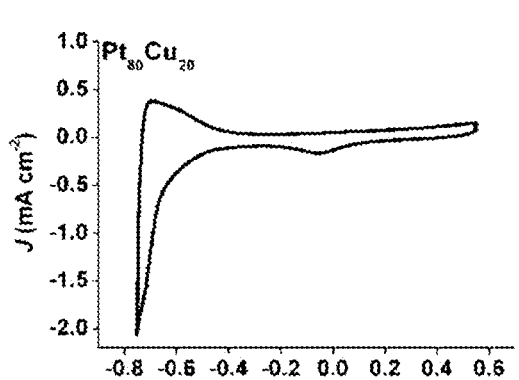
Figure 16C:
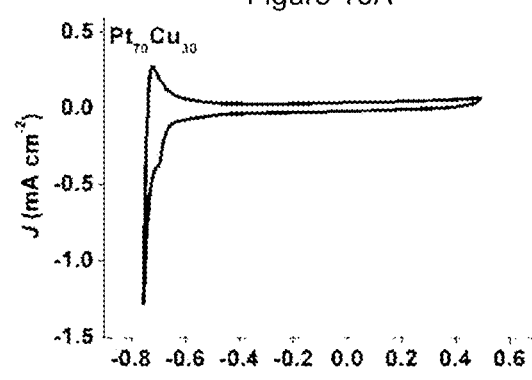
Figure 16D:
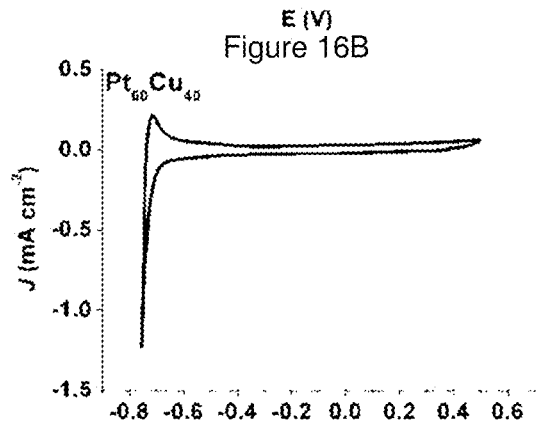
Figure 16E:
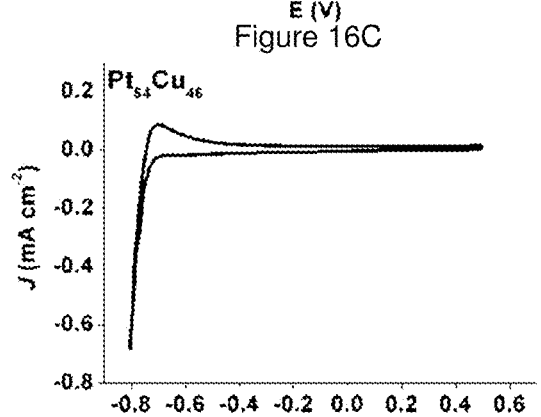
Figure 17A:
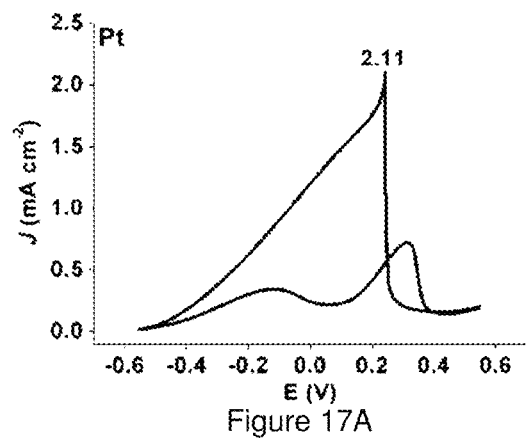
FIG. 17 shows I-V characteristics of Pt and $Pt_xCu_{(100-x)}$ nanocubes in 0.1 M $HClO_4$ containing 2.0 M HCOOH at the sweep rate of 50 mV $s^{-1}$.
Figure 17B:
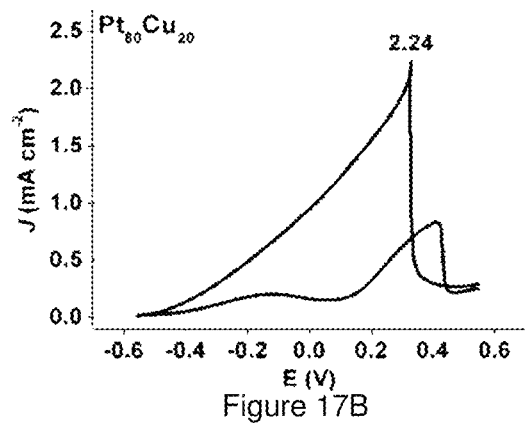
Figure 17C:
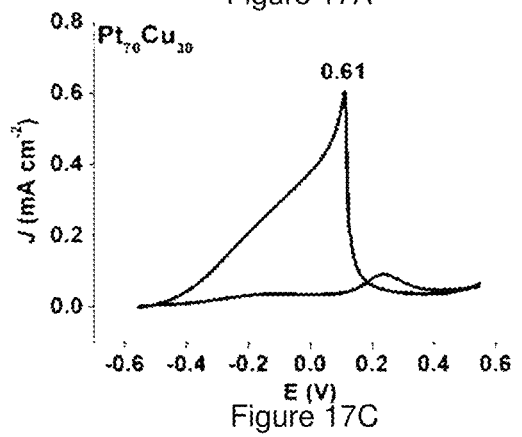
Figure 17D:
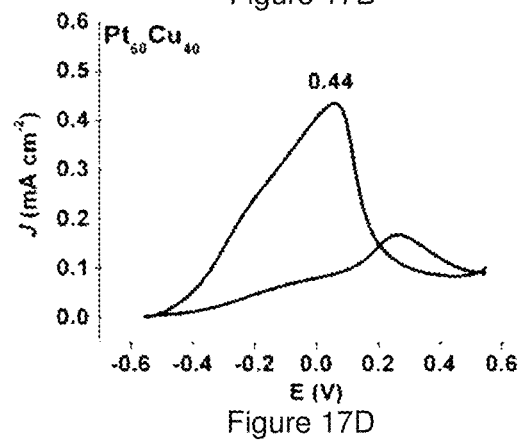
Figure 17E:
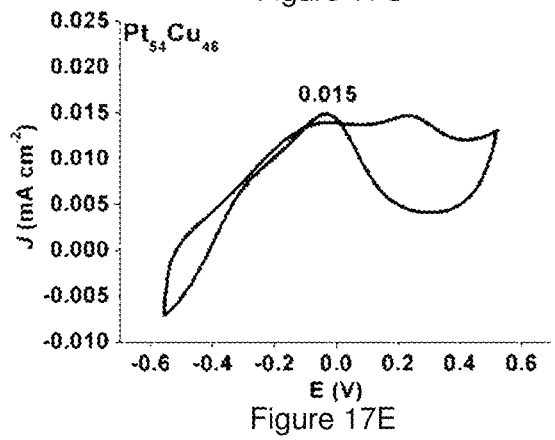

FIG. 13A represents comparative stability test results of electrodes prepared from NCbs of $Pt_{80}Cu_{20}$ alloy and pure Pt in similar size. It can be clearly seen that the catalytic activity of the Pt catalyst rapidly decreases, and its current density reaches values as low as 1.9 mA/cm² after 20.8 hours of cycling (1700 cycles) in the potential range of −0.55 V to 0.55 V at a sweep rate of 50 mV/s. Such behavior for the pure Pt catalysts is generally attributed to a strong CO adsorption and (in turn) poisoning of the active surface. A substantially improved stability is demonstrated by the bimetallic $Pt_{80}Cu_{20}$ catalyst, showing that the activity of this catalyst is higher than original activity of the pure Pt NCbs even after 300 hours of cycling (24546 cycles) in the working solution. The enhanced CO tolerance from this bimetallic catalyst is most likely due to the electronic ligand-effect mechanism, that is, the electronic properties of platinum are modified by alloy orbital overlapping, resulting in a weakening of the binding strength of CO adsorbed on Pt—Cu catalyst. According to a report of other Pt-based bimetallic catalysts,[28] such overlapping leads to an improved electrocatalytic activity and/or stability of some bimetallic catalysts towards formic acid oxidation. The decrease of the activity after 300 hours of cycling for the $Pt_{80}Cu_{20}$ NCbs, as seen in FIG. 13A, is also expected and can be attributed to the formation of a Pt-skin layer on the surface of NCbs as a result of long-term electrochemical cycling in acidic electrolytes.[15] The Pt-skin formation was caused either by the Pt dissolution from the alloy followed by re-deposition and rearrangement on the surface,[15] and/or by electrochemical dissolution of the less noble component from the alloy accompanied by regrouping of Pt atoms.[29] In our experiments, a 50% reduction of the Cu amount after the stability tests is ascertained based on an EDS analysis. FIG. 13B presents CV curves for Pt NCbs before and after the cycling and that for $Pt_{80}Cu_{20}$ NCbs after the cycling, suggesting that both types of the CV curves, measured on the pure Pt and the $Pt_{80}Cu_{20}$, are identical after the stability tests. This further supports the formation of Pt-skin on the surface of bimetallic NCbs, after a long-term cycling in an acidic solution.

In summary, bimetallic $Pt_xCu_{100-x}$ NCbs (x=54-80 at. %) were successfully prepared through a facile colloidal approach and a comparative investigation of the electrocatalytic activity and long-term NCb stability in the formic acid oxidation process was carried out. As a key finding, $Pt_{80}Cu_{20}$ NCbs is identified as the best electrocatalysts on the basis of the maintainable electrocatalytic activity (which is slightly superior to that of pure Pt NCbs) and remarkable long-term stability (~300 hours vs 3 hours for Pt NCbs). Such superior overall electrocatalytic performance (especially the higher CO tolerance) suggests that the $Pt_{80}Cu_{20}$ NCbs could be regarded as a promising anode catalyst in the fuel cell industry.

Figure 18:
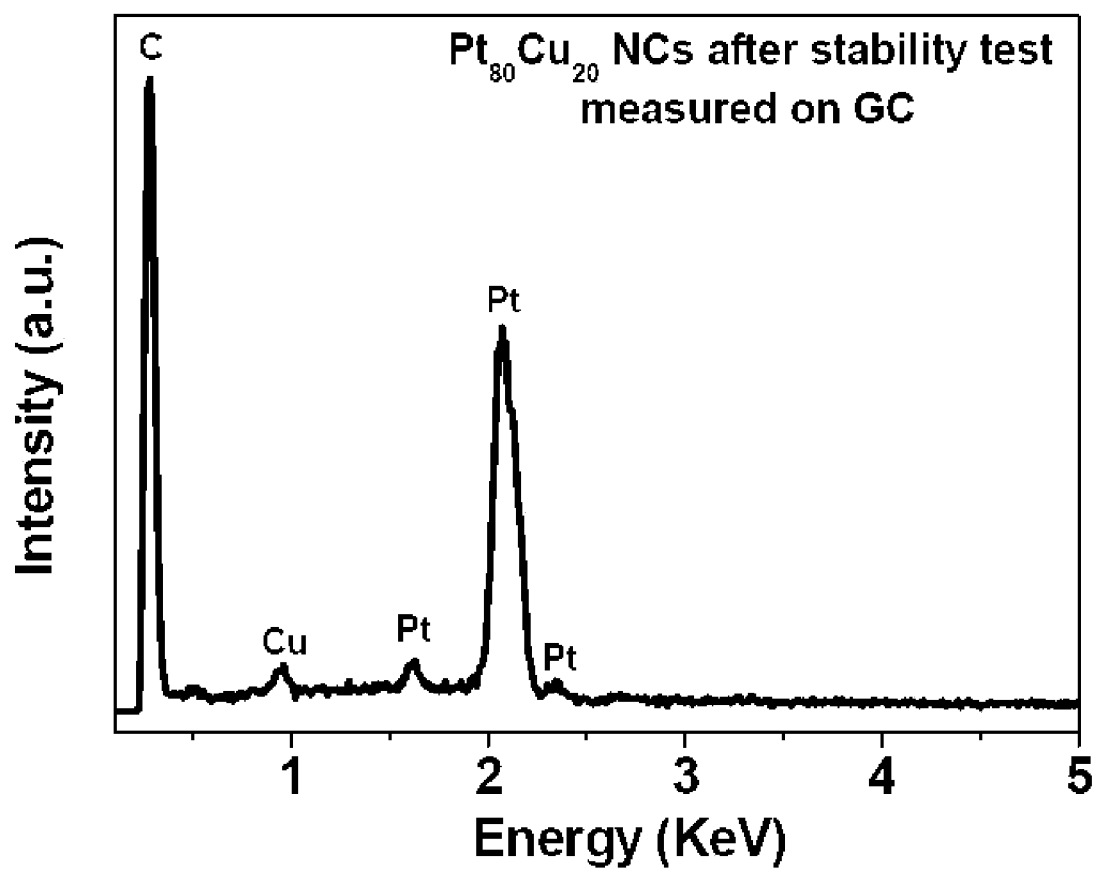
FIGS. 18 and 19 show a typical SEM-EDS result, showing the composition of sample $Pt_{80}Cu_{20}$ nanocubes after the electrochemical stability test.
Figure 19:
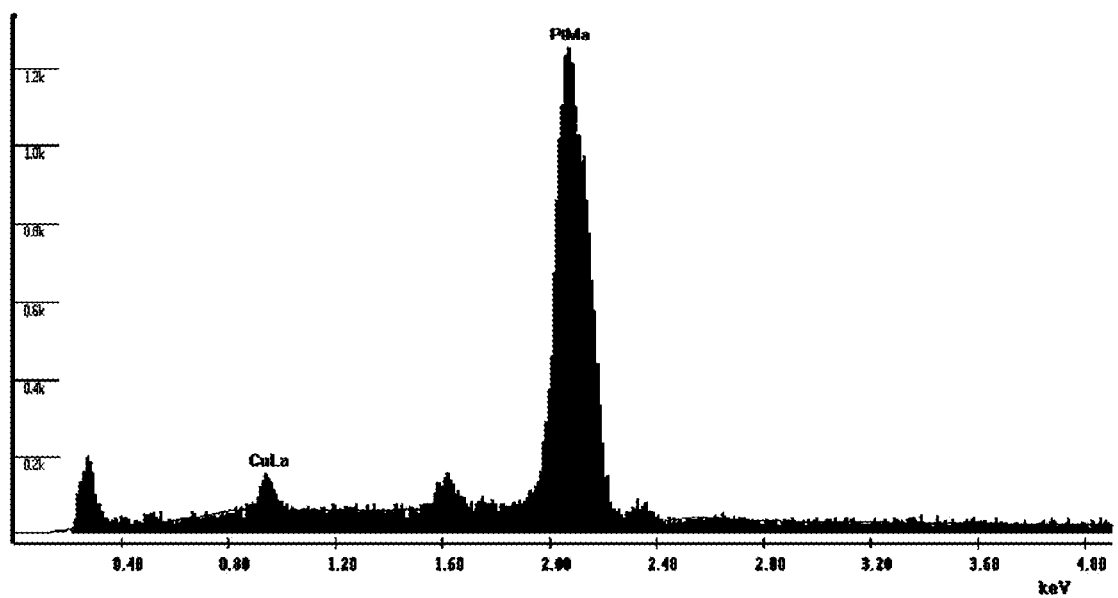

FIGS. 18 and 19 show a typical SEM-EDS result, showing the composition of sample $Pt_{80}Cu_{20}$ NCbs after the electrochemical stability test. See Table 2:

TABLE 2

| Element | Wt % | At % |
| --- | --- | --- |
| CuL | 3.36% | 9.65% |
| PtM | 96.64% | 90.35% |
| Matrix | Correction | ZAF |

REFERENCES

Incorporated Herein by Reference

[1] H. Song, E Kim, S. Connor, G A. Somorjai, P. Yang, *J. Phys. Chem. B* 2005, 109, 188-193.
[2] Y.-J. Zhao, S.-S. Chng, T.-P. Loh, *J. Am. Chem. Soc.* 2007, 129, 492-493.
[3] R. Narayanan, M. A. El-Sayed, *Nano. Lett.* 2004, 4, 1343-1348.
[4] M. Subhramannia, K. Ramaiyan, V. K. Pillai, *Langmuire* 2008, 24, 3576-3583.
[5] N. Tian, Z.-Y. Zhou, S.-G Sun, Y. Ding, Z. L. Wang, *Science* 2007, 316, 732-735.
[6] D. Xu, Z. Liu, H. Yang, Q. Liu, J. Zhang, J. Fang, S. Zou, K. Sun, Angew. *Chem. Int. Ed.* 2009, 23, 4217-4221.
[7] B. Lim, M. Jiang, P. H. C. Camargo, E. C. Cho, J. Tao, X. Lu, Y. Zhu, Y. Xia, *Science* 2009, 324, 1302-1305.
[8] T. Pellegrino, A. Fiore, E. Carlino, C. Giannini, P. D. Cozzoli, G Ciccarella, M. Respaud, L. Palmirotta, R. Cingolani, L. Manna, *J. Am. Chem. Soc.* 2006, 128, 6690-6698.
[9] F. Zhao, M. Rutherford, S. Y. Grisham, X. Peng, *J. Am. Chem. Soc.* 2009, 131, 5350-5358.
[10] Z. Peng, H. Yang, *J. Am. Chem. Soc.* 2009, 131, 7542-7543.
[11] K. Ahrenstorf, O. Albrecht, H. Heller, A. Kornowski, D. Gerlitz, H. Weller, *Small* 2007, 3, 271-274.
[12] I.-S. Park, K.-S. Lee, J.-H. Choi, H.-Y. Park, Y.-E. Sung, *J. Phys. Chem. C* 2007, 111, 19126-19133.
[13] H. Ye, R. M. Crooks, *J. Am. Chem. Soc.* 2007, 129, 3627-3633.
[14] W. Chen, J. Kim, S. Sun, S. Chen, *J. Phys. Chem. C* 2008, 112, 3891-3898.
[15] W. Chen, J. Kim, S. Sun, S. Chen, *Langmuire* 2007, 23, 11303-11310.
[16] Y. Li, X. L. Zhang, R. Qiu, R. Qiao, Y. S. Kang, *J. Phys. Chem. C* 2007, 111, 10747-10750.
[17] K. Ahrenstorf, H. Heller, A. Kornowski, J. A. C. Broekaert, H. Weller, *Adv. Funct. Mater* 2008, 18, 3850-3856.
[18] E. V. Shevchenko, D. V. Talapin, H. Schnablegger, A. Kornowski, Ö. Festin, P. Svedlindh, M. Haase, H. Weller, *J. Am. Chem. Soc.* 2003, 125, 9090-9101.
[19] M. Chen, J. P. Liu, S. Sun, *J. Am. Chem. Soc.* 2004, 126, 8394-8395.
[20] B. Stahl, J. Ellrich, R. Theissmann, M. Ghafari, S. Bhattacharya, H. Hahn, N. S. Gajbhiye, D. Kramer, R. N. Viswanath, J. Weissmüller, H. Gleiter, *Phys. Rev. B* 2003, 67, 14422-14434.
[21] C. Bock, C. Paquet, M. Couillard, G A. Botton, B. R. MacDougall, *J. Am. Chem. Soc.* 2004, 126, 8028-8037.
[22] R. J. Best, W. W. Russell, *J. Am. Chem. Soc.* 1953, 76, 838-842.
[23] K. J. J. Mayrhofer, D. Strmcnik, B. B. Blizanac, V. Stamenkovic, M. Arenz, N. M. Markovic, *Electrochem. Acta* 2008, 53, 3181-3188.
[24] V. Mazumder, S. Sun, *J. Am. Chem. Soc.* 2009, 131, 4588-4589.
[25] S. Gottesfeld, in *Fuel Cell Catalysis—A Surface Science Approach* (*The Wiley Series on Electrocatalysis and Electrochemistry*) (Ed.: M. Koper), John Wiley & Sons, Hoboken, N.J., 2009, pp. 6.
[26] A. Cuesta, M. Escudero, B. Lanova, H. Baltruschat, *Langmuire* 2009, 25, 6500-6507.
[27] A. Mild, S. Ye, M. Osawa, *Chem. Commun.* 2002, 1500-1501.
[28] W. Chen, J. Kim, S. Sun, S. Chen, *Phys. Chem. Chem. Phys.* 2006, 8, 2779-2786.
[29] W. Chen, J. Kim, L.-P. Xu, S. Sun, S. Chen, *J. Phys. Chem. C* 2007, 111, 13452-13459.
[30] V. Mazumder, S. Sun, *J. Am. Chem. Soc.* 2009, 131, 4588-4589.

The invention claimed is:

1. Catalytic nanocubes, enclosed by {100} facets, formed by a process comprising:
   heating in an organic solution, a soluble platinum salt, a transition metal salt comprising copper, and a set of surface active capping agents, the solution having shape control properties to selectively control a particle shape; and
   reducing the platinum salt and transition metal salt to form catalytically active platinum alloy nanocubes.

2. The catalytic nanocubes according to claim 1, wherein the soluble platinum salt is platinum (II) acetylacetonate.

3. The catalytic nanocubes according to claim 1, wherein the transition metal salt is copper (II) acetylacetonate.

4. The catalytic nanocubes according to claim 1, wherein the process is conducted under anoxic conditions.

5. The catalytic nanocubes according to claim 1, wherein the solution comprises a thiol coordination agent.

6. The catalytic nanocubes according to claim 1, wherein the solution comprises a diol reducing agent.

7. The catalytic nanocubes according to claim 1, wherein the solvent is heated to about 210° C. to 230° C.

8. The catalytic nanocubes according to claim 1, wherein the formed particles comprise at least 90% nanocubes.

9. The catalytic nanocubes according to claim 1, wherein the formed particles are substantially monodisperse.

10. The catalytic nanocubes according to claim 1, wherein:
    the surface active capping agent comprises tetraoctylammonium bromide;
    the soluble platinum salt comprises platinum (II) acetylacetonate;
    the transition metal salt comprises copper (II) acetylacetonate; and
    the platinum salt and transition metal salt are reduced by at least one of an amine and a diol.

11. Substantially monodisperse nanocube alloy particles enclosed by {100} facets, formed by a process comprising:
    heating in an organic solution, a soluble platinum salt, a transition metal salt comprising copper, and a set of surface active capping agents, the solution having shape control properties to selectively control a particle shape; and
    reducing the platinum salt and transition metal salt to form catalytically active platinum alloy nanocubes.

12. The substantially monodisperse catalytic nanocubes according to claim 11, wherein the soluble platinum salt is platinum (II) acetylacetonate and the transition metal salt is copper (II) acetylacetonate.

13. The substantially monodisperse catalytic nanocubes according to claim 11, wherein the process is conducted under anoxic conditions.

14. The substantially monodisperse catalytic nanocubes according to claim 11, wherein the solution comprises a thiol coordination agent.

15. The substantially monodisperse catalytic nanocubes according to claim 11, wherein the solution comprises a diol reducing agent.

16. The substantially monodisperse catalytic nanocubes according to claim 11, wherein the solvent is heated to about 210° C. to 230° C.

17. The substantially monodisperse catalytic nanocubes according to claim 11, wherein:
- the solution is heated to about 210° C. to 230° C. under anoxic conditions;
- the solution further comprises a thiol coordination agent;
- the surface active capping agent comprises tetraoctylammonium bromide;
- the soluble platinum salt comprises platinum (II) acetylacetonate;
- the transition metal salt comprises copper (II) acetylacetonate; and
- the platinum salt and transition metal salt are reduced by at least one of an amine and a diol.

18. Substantially monodisperse nanocube alloy particles according to claim 11, wherein:
- the surface active capping agent comprises tetraoctylammonium bromide;
- the soluble platinum salt comprises platinum (II) acetylacetonate;
- the transition metal salt comprises copper (II) acetylacetonate; and
- the platinum salt and transition metal salt are reduced by at least one of an amine and a diol reducing agent.

19. Substantially monodisperse nanocube alloy particles according to claim 11, wherein the solution has shape control properties to selectively control a particle shape to form cubic particles, and the platinum salt and transition metal salt are reduced with a chemical reducing potential to form the catalytically active platinum alloy nanocubes.

* * * * *